: 3,824,224
PROCESS FOR PREPARING ALTERNATING CO-
POLYMERS OF BUTADIENE AND ALPHA-
OLEFINS
Akihiro Kawasaki and Isao Maruyama, Ichihara, Japan, assignors to Maruzen Petrochemical Co., Ltd., Tokyo, Japan
No Drawing. Original application Apr. 17, 1970, Ser. No. 29,678, now Patent No. 3,700,638. Divided and this application June 5, 1972, Ser. No. 259,593
Claims priority, application Japan, Apr. 25, 1969, 44/31,429; May 13, 1969, 44/36,162; June 19, 1969, 44/47,913; July 3, 1969, 44/52,149; Aug. 15, 1969, 44/54,143; Sept. 10, 1969, 44/71,260; Sept. 25, 1969, 44/75,828; Sept. 30, 1969, 44/77,410, 44/77,411; Oct. 9, 1969, 44/80,281; Oct. 31, 1969, 44/86,898, 44/86,899; Dec. 4, 1969, 44/96,888
The portion of the term of the patent subsequent to Oct. 24, 1989, has been disclaimed
Int. Cl. C08d 1/14, 3/02, 3/06
U.S. Cl. 260—85.3 R          7 Claims

ABSTRACT OF THE DISCLOSURE

A process for preparing an alternating copolymer of butadiene and α-olefine having the formula of $CH_2=CHR$, wherein R represents phenyl or a normal or branched chain lower alkyl radical, which comprises contacting butadiene and the α-olefine in liquid phase with a catalyst system of an organoaluminum compound, a vanadium compound having V—X linkage (X is halogen) and a compound having M—OR linkage (M is an atom whose electro negativity (H. O. Pritchard, Chem. Rev., 55, 745 (1955)) is lower than 2.2 and R is a hydrocarbon radical of alkyl, aryl, cycloalkyl or halogenated ether radical) or a compound having $(O-M)_x-(O-M')_y-OR$ linkage (M is defined as above and M' can be defined by the same definition given in M). Optionally, a halogen atom, a halogen containing compound, a metal oxide or a metalloid oxide can be added to the above mentioned three component catalyst system as the fourth component to further improve the catalytic properties. The alternating copolymers obtained by this invention are rubber-like in character and can be used as polymeric plasticizers, in adhesives and can be vulcanized with sulfur or a sulfur compound to produce vulcanized elastomers.

BACKGROUND OF THE INVENTION

This is a division of application Ser. No. 29,678, filed Apr. 17, 1970 now U.S. Pat. 3,700,638.

1. Field of the Invention

The present invention relates to a process for the production of high molecular weight alternating copolymers of butadiene and α-olefine and to the catalyst used in said process.

2. Description of the Prior Art

Because of its chipping and cutting properties and its low skid resistance, the demand for cis-1,4 polybutadiene in the field of automobile tires is not so large as was expected at first. The defects have been ascribed to its unbranched straight-chain structure. In order to overcome these defects, many attempts have been made to product alternating copolymers of butadiene and α-olefine, for example, butadiene and propylene, butadiene and 1-butene, etc. However, in general, it is not easy to produce even a random copolymer of butadiene and α-olefine by an ionic catalyst.

For instance, German Pat. 1,173,254 claims a process for preparing a copolymer of conjugated diene and mono-olefine using vanadium (V) oxychloride as the catalyst, but the examples do not show a copolymerization reaction of butadiene and propylene. German Pat. 1,144,924 claims a process for preparing a copolymer of diene and ethylene or propylene by using a catalyst system consisting of a compound of Ti, Zr, Ce, V, Nb, Ta, Cr, Mo or W in which the metal is at least in part below a valency of 3. This patent shows the copolymerization reaction of butadiene and ethylene by titanium tetrachloride-lithiumaluminumhydride, titanium tetrachloride-phenylmagnesiumbromide, titanium tetrachloride-sodium dispersion, zirconium tetrachloride-tintetrabutyl and tetraoctyltitanate-phenylmagnesiumbromide catalyst systems in its examples, but a process for preparing a copolymer of butadiene and propylene is not shown. Belgian Pat. 625,657 also describes a process for preparing copolymers and terpolymers of butadiene with ethylene and (or) α-olefines by using a catalyst system containing a hydrocarbon-soluble vanadium compound and an organo-aluminum compound containing more than one organic group having strong sterical hindrance, e.g. 3-methyl-butyl, cycloalkyl or cyclopentylmethyl, and it claims a process for preparing ethylene-propylene-butadiene terpolymer. However, no example of butadiene-propylene copolymer is shown in it.

On the other hand, British Pat. 1,108,630 shows a process for preparing a rubbery random copolymer of butadiene and propylene of high molecular weight with high content of propylene by using a three components catalyst system consisting of trialkylaluminum, iodine and a compound having the general formula of $TiBr_nCl_{4-n}$ wherein $n$ is zero or an integer of 1 to 4. The microstructure of butadiene unit and the content of propylene unit in the copolymer are shown in the patent. But there are shown no experimental results which support the assumption which the copolymer should be a random copolymer of butadiene and propylene. A random copolymer of butadiene and propylene was also prepared by using a catalyst system consisting of triethylaluminum, titanium tetrachloride and polypropylene oxide. Polypropylene oxide was used as a randomizer and therefore a copolymer of butadiene and propylene prepared by the catalyst system of triethylaluminum and titanium tetrachloride was shown to be block-type (paper presented at 2nd Symposium on Polymer Synthesis, Tokyo, Oct. 5, 1968, The Society of Polymer Science, Japan). British Pat. 1,026,615 claims a process for preparing a random copolymer of butadiene and propylene by forming a catalyst system of triethylaluminum and titanium tetrachloride in the presence of propylene, and then adding butadiene to the catalyst system. According to the patent, the propylene content of the copolymer was much higher than that of the copolymer prepared by the catalyst formed after the monomers were mixed. This result is inconsistent with the result described in the above paper. A copolymerization reaction of butadiene and propylene was also carried out by using a catalyst system of triethylaluminum and titanium tetrachloride prepared in propylene and the product was confirmed, by fractional precipitation test, to be a copolymer of butadiene and propylene (Chemistry of High Polymers, The Society of Polymer Science, Japan, 20, 461 (1963)). The content of this paper corresponds to that of the above British Patent, but there is no description in it showing that the copolymer should be a random copolymer of butadiene and propylene.

According to the method of British Pat. 982,708, a mixture containing 80–95 mole percent butadiene, the rest being 4-methyl-1-pentene, is polymerized at a temperature in the range 0° to 30° C. by a catalyst system which is the reaction product of vanadium (V) oxychloride with triisobutylaluminum, an aluminumdialkyl monochloride or an aluminum sesquialkyl chloride. The microstructure of the copolymer is not shown in the patent. British Pat. 924,654 describes a process for preparing a copolymer of butadiene and propylene by using an "Alfin" catalyst. The copolymer showed a characteristic infra-red absorption band at 11.95 microns. It was ascribed to tri-substituted ethylene structure. Therefore, the result does not support the assumption that the copolymer should be a random or alternating copolymer of butadiene and propylene.

SUMMARY OF THE INVENTION

The object of the present invention is to provide new catalytic systems giving high molecular weight alternating copolymers of butadiene and α-olefine in high yield.

In accordance with this invention, we have found that by using either one of the catalyst system of 1. an organoaluminum compound—a vanadium compound having V—X linkage—a compound having M—OR linkage,
2. an organoaluminum compound—a vanadium compound having V—X linkage—a compound having $$(O-M)_x-(O-M')_y-OR$$

linkage,
3. an organoaluminum compound—a vanadium compound having V—X linkage— a compound having M—OR linkage—a halogen atom or a halogen compound,
4. an organoaluminum compound—a vanadium compound having V—X linkage—a compound having $$(O-M)_x-(O-M')_y-OR$$

linkage—a halogen atom or a halogen compound,
5. an organoaluminum compound—a vanadium compound having V—X linkage—a compound having M—OR linkage—a metal oxide or a metalloid oxide or
6. an organoaluminum compound—a vanadium compound having V—X linkage—a compound having $$(O-M)_x-(O-M')_y-OR$$

linkage—a metal oxide or a metalloid oxide high molecular weight alternating copolymers of butadiene and α-olefine can be produced in high yield. The alternating copolymers of this invention are rubber-like in character and can be used as polymeric plasticizers, in adhesives and can be vulcanized with sulfur or a sulfur compound to produce vulcanized elastomers.

Although, contrary to our expectation the microstructure of the butadiene units of all of these alternating copolymers were trans 1,4-configuration, the glass transition temperature of these copolymers is very low and they show rubber-like elasticity. The result coincides with that of the alternating copolymer of butadiene and acrylonitrile (J. Polymer Sci., Part B, II, 411 (1969)). The microstructure of the butadiene unit of the copolymer was trans 1,4-configuration, but the copolymer also showed rubber-like elasticity.

The organoaluminum compounds which form the first component of the catalyst of this invention may be defined by the formula $AlR_nX_{3-n}$ wherein R is a hydrocarbon radical such as alkyl radical, aryl radical or cycloalkyl radical, X is halogen and n is a number from 2 to 3. The vanadium compounds having V—X linkage (X is halogen) which form the second component of the catalyst of this invention are vanadium (IV) halide having the general formula of $VX_4$; vanadium (V) oxyhalide having the general formula of $VOX_3$; halogenated vanadium oxyalkoxide having the general formula of $OV(OR)_nX_{3-n}$ (R is a hydrocarbon radical such as alkyl radical, aryl radical or cycloalkyl radical and n is a number from 1 to 2); a vanadium complex compound having V—X linkage such as halogenated cyclopentadienyl vanadium having the general formula of $V(C_5H_5)_nX_{4-n}$ (n is a number from 1 to 2) or $V(C_5H_5)_2X$, halogenated vanadium oxyacetylacetonate having the general formula of $$OV(C_5H_7O_2)_nX_{3-n}$$

(n is a number from 1 to 2), etc. The compounds having M—OR linkage (M is an atom whose electro negativity (H. O. Pritchard, Chem. Rev., 55, 745 (1955)) is lower than 2.2 and R is a hydrocarbon radical such as alkyl radical, aryl radical or cycloalkyl radical or halogenated ether radical) which form the third component of the catalyst of this invention are compound having the general formula of $AlR_n(OOH)_{3-n}$ (n is a number from 0 to 2), compounds having the general formula of $AlX_n(OR)_{3-n}$ (X is halogen and n is a number from 1 to 2), compounds having the general formula of $$X(C_3H_6O)_n-\underset{\underset{X}{|}}{Al}-(OC_3H_6)_mX$$

(m and n are integers) prepared from aluminum halide and propylene oxide, compounds having the general formula of NaOR, compounds having the general formula of $Si(OR)_4$, compounds having the general formula of $Ti(OR)_4$, compounds having the general formula of $Ti(OR)_nX_{4-n}$ (X is halogen and n is a number from 1 to 3) compounds having the general formula of $OV(OR)_3$, compounds having the general formula of $Zr(OR)_4$, compounds having the general formula of $Cr(OR)_4$, compounds having the general formula of $B(OR)_3$, compounds having the general formula of $P(OR)_3$, etc. The compounds having $(O-M)_x-(O-M')_y-OR$ linkage (M and M' are atoms whose electro negativity (H. O. Pritchard, Chem. Rev., 55, 745 (1955)) is lower than 2,2, R is a hydrocarbon radical such as alkyl radical, aryl radical or cycloalkyl radical or halogenated ether radical and x and y are zero or integers, but both x and y cannot be zero at the same time, form the other third component of the catalyst of this invention. They are prepared by reacting the compounds having M—OR linkage as described above with a proper amount of water and then removing the unreacted raw materials and reaction byproducts from the reaction products. They are also prepared by adding water and then alcohol, alcohol and then water or a mixture of water and alcohol to the compounds having M—R linkage at a suitable conditions and then removing unreacted raw materials and reaction byproducts from the reaction mixture. They are also prepared by the ester elimination reaction between the compounds having M—OR linkage and the carboxylate of M or M' atom. The metal oxides or metalloid oxides which form the fourth component of the catalyst of this invention are magnesium oxide, zinc oxide, aluminum oxides, titanium dioxide, vanadium pentoxide, silicon dioxide, silica-alumina, zeolite, boron troxide, etc. The halogen compounds which form the other fourth component of the catalyst of this invention are halides or oxyhalides which show the properties of Lewis acid such as chromyl halide having the general formula of $CrO_2X_2$, ferric halide having the general formula of $FeX_3$, boron halide having the general formula of $BX_3$, titanium tetrahalide having the general formula of $TiX_4$, phosphorus pentahalide having the general formula of $PX_5$, stannic halide having the general formula of $SnX_4$, antimony pentahalide having the general formula of $SbX_5$, oxyaluminum halide having the general formula of $AlOX$, aluminum halide having the general formula of $AlX_3$, tungsten hexahalide having the general formula of $WX_6$, cuprous halide having the general formula of $CuX$, manganous halide having the general formula of $MnX_2$, magnesium halide having the general formula of $MgX_2$, zinc halide having the general formula of $ZnX_2$, etc.; coordinated complex of the halides or oxyhalides described above such as aluminum halide-ether complex, boron halide-ether complex, etc.; halogenated organometallic compounds such as halogenated organoaluminum compounds having the general formula of $AlR_nX_{3-n}$ (R is a hydrocarbon radical such as alkyl radical, aryl radical or cycloalkyl radical and $n$ is a number from 1 to 2), halogenated organoaluminum compound having the general formula of $AlX_n(OR)_{3-n}$ ($n$ is a number from 1 to 2), halogenated organotitanium compounds having the general formula of $TiX_n(OR)_{4-n}$ ($n$ is a number from 1 to 3), etc.; halogenated coordinated complex of transition metal having transition metal—X linkage (X is halogen) such as the compounds having the general formula of $(C_5H_5)_2CrX$, $(C_5H_5)Mo(CO)_3X$, $$(C_5H_5)_2IrX_3,$$

etc.; halogenated alkane compounds such as halogenated tert-butyl, halogenated sec-butyl, carbon tetrahalide, etc. However, please note that a compound $AlX_n(OR)_{3-n}$ also acts as a third component of the catalyst system, and therefore if for instance, $AlX(OR)_2$ is used as the third component of the catalyst, the compound cannot be used as the fourth component of the same catalyst.

In the preferred embodiment the molar ratio of organoaluminum compound which form the first component of the catalyst of the present invention to vanadium compound having V—X linkage which form the second component of the catalyst should be higher than 0.5 (Al/V>0.5).

The α-olefine should be one having the general formula:

$$CH_2=CHR$$

wherein R may be a normal chain or branched chain lower alkyl group or a phenyl group.

The preparation of the alternating copolymer of butadiene and α-olefine is carried out by contacting butadiene with α-olefine in liquid phase in the presence of the catalyst system described above. The copolymerization reaction is generally carried out in the presence of a liquid organic diluent. A suitable diluent that can be used for the copolymerization reaction is a hydrocarbon compound, such as heptane, octane, isooctane, benzene or toluene. The temperature of the copolymerization reaction may be varied from −100° C. to 50° C. and sufficient pressure is employed to keep the monomers in liquid phase. The molar ratio of butadiene to α-olefine in the initial monomer composition may be from 20:80 to 80:20 and more preferably is 50:50.

At the completion of the copolymerization reaction the product is precipitated and deashed using a methanol-hydrochloric acid mixture. The precipitated product is washed with methanol for several times and dried under vacuum. Thereafter the product is extracted with methyl ethyl ketone and diethyl ether successively. The methyl ethyl ketone soluble fraction is a low molecular weight alternating copolymer and methyl ethyl ketone insoluble and diethyl ether soluble fraction is a high molecular weight alternating copolymer.

DESCRIPTION OF THE PREFERRED EMBODIMENTS

The invention will be illustrated with reference to the following Examples.

Example 1

The usual, dry, air-free technique was employed and varying amounts of M—OR compound, varying amounts of toluene and varying amounts of vanadium (V) oxychloride solution in toluene (1 molar solution) or varying amounts of vanadium (IV) chloride were put successively in a 25 milliliters glass bottle at 25° C. Then the bottle was left alone at 25° C. for 10 minutes. Thereafter the bottle was held in a low temperature bath at −78° C. and varying amounts of organoaluminum compound solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 1. Ref. 1–Ref. 4 show the results obtained by using the two components catalysts consisting of organoaluminum compound and V—X compound and the other copolymerization conditions were the same as the ones in the example. It is found that by adding M—OR compound to the two components catalyst systems of organoaluminum compound and V—X compound as the third component the yield of the high molecular weight alternating copolymer of butadiene and propylene (MEK insoluble and diethyl ether soluble fraction) increased.

TABLE 1

| Exp. No. | Diluent toluene (ml.) | Organo-aluminum compound | Mmol | V-X compound | | M-O R compound | | MEK soluble fraction (g.) | MEK insoluble, diethyl ether soluble fraction (g.) | $[\eta]$** (dl./g.) |
|---|---|---|---|---|---|---|---|---|---|---|
| 1 | 5 | Al(i-Bu)₃ | 2.5 | VOCl₃, mmol | 1.0 | Al(Oi-Pr)₃, g | 0.24 | 0.47 | 2.15 | 0.45 |
| Ref. 1 | 5 | Al(i-Bu)₃ | 2.5 | VOCl₃, mmol | 1.0 | | | 1.57 | 0.13 | |
| 2 | 6 | Al(i-Bu)₃ | 2.5 | VCl₄, ml | 0.1 | Al(Oi-Pr)₃, g | 0.24 | 1.02 | 1.03 | |
| Ref. 2 | 6 | Al(i-Bu)₃ | 2.5 | VCl₄, ml | 0.1 | | | 1.83 | 0.08 | |
| 3 | 5 | AlEt₃ | 2.5 | VOCl₃, mmol | 1.0 | Al(Oi-Pr)₃, g | 0.24 | 0.36 | 1.12 | |
| Ref. 3 | 5 | AlEt₃ | 2.5 | VOCl₃, mmol | 1.0 | | | 1.26 | Trace | |
| 4 | 4 | AlEt₂Cl | 4.0 | VOCl₃, mmol | 1.0 | Al(Oi-Pr)₃, g | 0.24 | 0.54 | 0.30 | |
| Ref. 4 | 4 | AlEt₂Cl | 4.0 | VOCl₃, mmol | 1.0 | | | 0.35 | Trace | |
| 5 | 3 | AlEt₃ | 4.0 | VOCl₃, mmol | 1.0 | AlCl(Oi-Pr)₂, mmol | 1.5 | 1.39 | 0.18 | |

*NOTE:
1 i-Bu=iso-Butyl; Et=Ethyl; i-Pr=iso-Propyl.
2 AlCl(Oi-Pr)₂: 1 molar solution in toluene.
**Intrinsic viscosity of MEK insoluble, diethyl ether soluble fraction measured in chloroform at 30° C.

Example 2

The usual, dry, air-free technique was employed and 0.24 g. aluminum triisopropoxide, 5 milliliters toluene and 1 milliliter vanadium (V) oxychloride solution in toluene (1 molar solution) were put successively in a 25 milliliters glass bottle at 25° C. Then the bottle was held in a low temperature bath at −78° C. and 2.5 milliliters triisobutylaluminum solution in toluene (1 molar solution), 3 milliliters styrene and 2 milliliters liquid butadiene were put successively into the bottle also employing the usual, dry, air-free technique. Thereafter the bottle was sealed and allowed to copolymerize at −30° C. for 16 hours. Alternating copolymer of butadiene and styrene showing high rubber-like elasticity was obtained. The yield was 1.02 g. When the two components catalyst system consisting of vanadium (V) oxychloride (1 mmol) and triisobutylaluminum (2.5 mmols) was employed and the other copolymerization conditions were the same as those described above, the yield of the alternating copolymer was 0.79 g.

Example 3

The usual, dry, air-free technique was employed and varying amounts of M—OR compound, varying amounts of toluene and varying amounts of vanadium (V) oxychloride solution in toluene (1 molar solution) or varying amounts of vanadium (IV) chloride were put successively in a 25 milliliters glass bottle at 25° C. Then the bottle was left alone at 25° C. for 10 minutes. Thereafter the bottle was held in a low temperature bath at —78° C. and 2.5 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 2. Ref. 1–Ref. 2 show the results obtained by using the two components catalysts consisting of triisobutylaluminum (2.5 mmol) and V—X compound (1.0 mmol) and the other copolymerization conditions were the same as the ones in the example. It is found that by adding M—OR compound to the two components catalyst system the yield of the high molecular weight alternating copolymer of butadiene and propylene (MEK insoluble and diethyl ether soluble fraction) increased.

nitrogen atmosphere. The solvent and unreacted propylene oxide were removed from the filtrate to obtain the object compound.

TABLE 3

| Exp. number | Diluent toluene (ml.) | Catalysts* | | | | Yield of alternating copolymer | | [η]** (dl./g.) |
|---|---|---|---|---|---|---|---|---|
| | | Al(i-Bu)₃ (mmol) | VOCl₃ (mmol) | Raw material composition for M—OR compound | | MEK soluble fraction (g.) | MEK insoluble, diethyl ether soluble fraction (g.) | |
| | | | | AlCl₃ (mmol) | Propylene oxide | | | |
| 1 | 7.5 | 0.5 | 0.05 | 0.1 | Excess | 0.18 | 0.82 | 0.75 |
| 2 | 7.5 | 0.5 | 0.05 | 0.5 | ___do___ | 0.04 | 0.51 | |
| Ref | 7.5 | 0.5 | 0.05 | | | 1.89 | 0.09 | |

*i-Bu=Isobutyl.
**Intrinsic viscosity of MEK insoluble, diethyl ether soluble fraction measured in chloroform at 30° C.

Example 5

The usual, dry, air-free technique was employed and 6.5 milliliters toluene, 0.1 milliliter vanadium (V) oxychloride solution in toluene (1 molar solution) or 0.1 millimole vanadium (IV) chloride and varying amounts of (O—M)$_x$—(O—M')$_y$—OR compound made from aluminum triisopropoxide and varying amounts of water were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and

TABLE 2

| Exp. number | Diluent toluene (ml.) | Catalysts* | | | | | | Yield of alternating copolymer | |
|---|---|---|---|---|---|---|---|---|---|
| | | Organo-aluminum compound | Mmol | V-X compound | Mmol | M-OR compound | | MEK soluble fraction (g.) | MEK insoluble, diethyl ether soluble fraction (g.) |
| 1 | 5 | Al(i-Bu)₃ | 2.5 | VOCl₃ | 1.0 | NaOEt, g | 0.12 | 1.85 | 0.20 |
| 2 | 6 | Al(i-Bu)₃ | 2.5 | VCl₄ | 1.0 | NaOEt, g | 0.12 | 1.81 | 0.20 |
| 3 | 5 | Al(i-Bu)₃ | 2.5 | VOCl₃ | 1.0 | B(OC₆H₅)₃, g | 0.35 | 0.67 | 0.38 |
| 4 | 5 | Al(i-Bu)₃ | 2.5 | VOCl₃ | 1.0 | Ti(OC₄H₉)₄, mmol | 0.7 | 0.52 | 0.21 |
| 5 | 5 | Al(i-Bu)₃ | 2.5 | VOCl₃ | 1.0 | P(OC₆H₅)₃, ml | 0.37 | 1.13 | 0.78 |
| Ref. 1 | 5 | Al(i-Bu)₃ | 2.5 | VOCl₃ | 1.0 | | | 1.58 | 0.13 |
| Ref. 2 | 6 | Al(i-Bu)₃ | 2.5 | VCl₄ | 1.0 | | | 1.83 | 0.08 |

*i-Bu=Isobutyl; C₆H₅=Phenyl; C₆H₉=n-Butyl.

Example 4

The usual, dry, air-free technique was employed and 7.5 milliliters toluene, 0.5 milliliter vanadium (V) oxychloride solution in toluene (0.1 molar solution) and varying amounts of M—OR compound made from aluminum chloride and propylene oxide were put successively in a 25 milliliters glass bottle at 25° C. Then the bottle was left alone at 25° C. for 10 minutes. Thereafter the bottle was held in a low temperature bath a —78° C. and 0.5 milliliter triisobutylaluminum solution in toluene (1 molar solution) and a mixture of 2 millilters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 3.

The M—OR compound used in this example was prepared as follows:

To a suspension of 10 millimoles anhydrous aluminum chloride in toluene maintained at 0° C., 40 millimoles propylene oxide was added drop-wise under agitation. The mixture was agitated for 1 hour at 0° C. and filtered in a a mixture of 2 milliliters liquid propylene, 2 milliliters liquid butadiene and 2 milliliters toluene were put successively into the bottle also employing the usual, air-free technique. Thereafter the bottle was sealed and allowed to copolymerize at —30° C. for 16 hours. The results are summarized in Table 4. It is found that by using the reaction product of aluminum triisopropoxide and water as the third component instead of aluminum triisopropoxide the yield of the high molecular weight alternating copolymer of butadiene and propylene (MEK insoluble and diethyl ether soluble fraction) increased.

The (O—M)$_x$—(O—M')$_y$—OR compound used in this example was prepared as follows:

The usual, dry, air-free technique was employed and varying amounts of water was added drop-wise into aluminum triisopropoxide solution in toluene under agitation at 25° C. Then the mixture was agitated for 2 hours at 25° C. Thereafter the unreacted raw materials and reaction byproduct such as aluminum triisopropoxide, water and alcohol were removed from the reaction product under vacuum and the compound remained in the reaction vessel was used as the object compound.

TABLE 4

| Exp. number | Diluent toluene (ml.) | Catalysts* | | | | | Yield of alternating copolymer | | |
|---|---|---|---|---|---|---|---|---|---|
| | | Al(i-Bu)₃ (mmol) | V-X compound | Raw material compositions for (O—M)ₓ—(O—M')ᵧ—OR compounds | | | MEK soluble fraction (g.) | MEK insoluble, diethyl ether soluble fraction (g.) | [η]** (dl./g.) |
| | | | | Mmol | M—OR compound | Mmol | H₂O (mmol) | | |
| 1 | 6.5 | 1.0 | VOCl₃ | 0.1 | Al(Oi-Pr)₃ | 1.0 | 0.5 | 0.05 | 1.97 | 0.69 |
| 2 | 6.5 | 1.0 | VOCl₃ | 0.1 | Al(Oi-Pr)₃ | 1.0 | 1.0 | 0.07 | 2.13 | 0.72 |
| 3 | 6.5 | 1.0 | VOCl₃ | 0.1 | Al(Oi-Pr)₃ | 1.0 | 1.5 | 0.06 | 0.47 | 0.68 |
| Ref. 1 | 6.5 | 1.0 | VOCl₃ | 0.1 | Al(Oi-Pr)₃ | 1.0 | | 0.04 | 0.05 | |
| 4 | 6.5 | 1.0 | VCl₄ | 0.1 | Al(Oi-Pr)₃ | 1.0 | 1.0 | 0.05 | 1.98 | |
| Ref. 2 | 6.5 | 1.0 | VCl₄ | 0.1 | Al(Oi-Pr)₃ | 1.0 | | 0.08 | 0.06 | |

*i-Pr=Isopropyl; i-Bu=Isobutyl.
**Intrinsic viscosity of MEK insoluble, diethyl ether soluble fraction measured in chloroform at 30° C.

Example 6

The usual, dry, air-free technique was employed and 7.0 milliliters toluene, 0.1 milliliter vanadium (V) oxychloride solution in toluene (1 molar solution) and varying amounts of $(O-M)_x-(O-M')_y-OR$ compound made from triethylaluminum, isopropylalcohol and water were put successively in a 25 milliliters glass bottle at 25° C. Then the bottle was left alone at 25° C. for 10 minutes. Thereafter the bottle was held in a low temperature bath at −78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 5.

The $(O-M)_x-(O-M')_y-OR$ compound used in this example was prepared as follows:

The usual, dry, air-free technique was employed and, for example, 20 millimoles isopropylalcohol was added dropwise into 10 milliliters triethylaluminum solution in toluene (1 molar solution) under agitation at −78° C. Then the mixture was agitated for 2 hours at 25° C. Thereafter 5 millimoles water was added dropwise into the reaction mixture under agitation at −78° C. Then the mixture was agitated for 2 hours at 25° C. and refluxed for 12 hours. Thereafter the unreacted raw materials and reaction byproducts were removed from the reaction mixture under vacuum and the compound remained in the reaction vessel was used as the object compound.

Example 7

The usual, dry, air-free technique was employed and 6.5 milliliters toluene, 0.1 milliliter vanadium (V) oxychloride solution in toluene and varying amounts of $(O-M)_x-(O-M')_y-OR$ compound were put successively in a 25 milliliters glass bottle at 25° C. Then the bottle was left alone at 25° C. for 10 minutes. Thereafter the bottle was held in a low temperature bath at −78° C. and 1.0 milliliter triisobutylaluminum solution in toluene (1 molar solution) and a mixture of 2 milliliters liquid propylene, 2 milliliters liquid butadene and 2 mlliliters toluene were put successively into the bottle also employing the usual, dry, air-free technique. Thereafter the bottle was sealed and allowed to copolymerize at −30° C. for 16 hours. The results are summarized in Table 6.

The $(O-M)_x(O-M')_y-OR$ compound used in this example was prepared as follows:

The usual, dry, air-free technique was employed and, for example, 10 milliliters water was added dropwise into 20 milliliters triethylaluminum solution in toluene (1 molar solution) under agitation at −78° C. Then the mixture was agitated for 2 hours at 25° C. Thereafter excessive isopropylalcohol was added drop-wise into the reaction mixture under agitation at −78° C. Then the mixture was agitated for 2 hours at 25° C. and refluxed for 13 hours. Thereafter the unreacted raw materials and reaction byproducts were removed from the reaction mixture unde vacuum and the compound remained in the reaction vessel was used.

TABLE 6

| Exp. number | Diluent toluene (ml.) | Catalysts* | | | | | | Yield of alternating copolymer | | |
|---|---|---|---|---|---|---|---|---|---|---|
| | | Al(i-Bu)₃ (mmol) | VOCl₃ (mmol) | Raw material composition for (O—M)ₓ—(O-M')ᵧ— compound | | | | MEK soluble fraction (g.) | MEK insoluble, diethyl ether soluble fraction (g.) | [η]** (dl./g.) |
| | | | | AlEt₃ (mmol) | H²O (mmol) | i-PrOH | | | | |
| 1 | 6.5 | 1.0 | 0.1 | 0.05 | 0.025 | Excess | | 0.82 | 0.79 | |
| 2 | 6.5 | 1.0 | 0.1 | 0.10 | 0.05 | do | | 0.36 | 0.68 | |
| 3 | 6.5 | 1.0 | 0.1 | 0.30 | 0.15 | do | | 0.16 | 1.10 | |
| 4 | 6.5 | 1.0 | 0.1 | 0.60 | 0.30 | do | | 0.07 | 2.42 | 0.64 |
| 5 | 6.5 | 1.0 | 0.1 | 1.00 | 0.50 | do | | 0.08 | 0.23 | |
| Ref | 6.5 | 1.0 | 0.1 | | | | | 0.89 | 0.12 | |

*i-Bu=Isobutyl; Et=Ethyl; i-Pr=Isopropyl.
**Intrinsic viscosity of MEK insoluble, diethyl ether soluble fraction measured in chloroform at 30° C.

Example 8

The usual, dry, air-free technique was employed and 6.5 milliliters toluene, 0.1 milliliter vanadium (IV) chloride

TABLE 5

| Exp. number | Diluent toluene (ml.) | Catalysts* | | | | | Yield of alternating copolymer | |
|---|---|---|---|---|---|---|---|---|
| | | Al(i-Bu)₃ (mmol) | VOCl₃ (mmol) | Raw material composition for (O—M)ₓ—(O—M')ᵧ—OR compound | | | MEK soluble fraction (g.) | MEK insoluble, diethyl ether soluble fraction (g.) |
| | | | | AlEt₃ (mmol) | i-PrOH (mmol) | H₂O (mmol) | | |
| 1 | 7.0 | 1.0 | 0.1 | 0.05 | 0.10 | 0.025 | 0.69 | 0.83 |
| 2 | 7.0 | 1.0 | 0.1 | 0.10 | 0.20 | 0.05 | 0.98 | 0.78 |
| 3 | 7.0 | 1.0 | 0.1 | 0.30 | 0.60 | 0.15 | 0.17 | 2.21 |
| 4 | 7.0 | 1.0 | 0.1 | 0.60 | 1.20 | 0.30 | 0.11 | 1.94 |
| 5 | 7.0 | 1.0 | 0.1 | 1.00 | 2.00 | 0.50 | 0.14 | 0.97 |

*i-Bu=Isobutyl; Et=Ethyl; i-Pr=Isopropyl.

solution in methylene chloride (1 molar solution) and varying amounts of (O—M)$_x$—(O—M')$_y$—OR compound were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 7.

The (O—M)$_x$—(O—M')$_y$—OR compound used in this example were prepared by the method as was described in Example 7.

liters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The yield of the methyl ethyl ketone soluble fraction was 1.56 g. and methyl ethyl ketone insoluble and diethyl ether soluble fraction was 0.35 g.

The (O—M)$_x$—(O—M')$_y$—OR compound used in this example was prepared as follows:

The usual, dry, air-free technique was employed and 20 millimoles water was added drop-wise into 20 milliliters triethylaluminum solution in toluene (1 molar solution) under agitation at —78° C. Then the mixture was agitated for 2 hours at 25° C. Thereafter excessive ethyl-alcohol was added drop-wise into the reaction mixture

TABLE 7

| Exp. number | Diluent Toluene (ml.) | Catalysts* Al(i-Bu)$_3$ (mmol) | VOCl$_4$ (mmol) | Raw material compositions for (O—M)$_x$—(O—M')$_y$—OR compounds Al-R compound | Mmol | H$_2$O (mmol) | Alcohol | copolymer MEK soluble fraction (g.) | MEK insoluble diethyl ether soluble fraction (g.) |
|---|---|---|---|---|---|---|---|---|---|
| 1 | 6.5 | 1.0 | 0.1 | AlEt$_3$ | 0.50 | 0.25 | i-PrOH Excess | 0.09 | 0.71 |
| 2 | 6.5 | 1.0 | 0.1 | AlEt$_2$Cl | 0.50 | 0.25 | sec-BuOH ...do..... | 0.99 | 0.20 |
| Ref | 6.5 | 1.0 | 0.1 | | | | | 1.81 | 0.13 |

*i-Bu=Isobutyl; Et=Ethyl; i-Pr=Isopropyl; sec-Bu=sec-butyl.

Example 9

The usual, dry, air-free technique was employed and 6.5 milliliters toluene, 0.1 milliliter vanadium (V) oxychloride solution in toluene (1 molar solution) and varying amounts of (O—M)$_x$—(O—M')$_y$—OR compound were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 8.

The (O—M)$_x$—(O—M')$_y$—OR compounds used in this example was prepared by the method as was described in Example 7.

under agitation at —78° C. Then the mixture was agitated for 2 hours at 25° C. Thereafter the unreacted raw materials and reaction byproducts were removed from the mixture under vacuum and 1 molar toluene solution of the compound was prepared.

Example 11

The usual, dry, air-free technique was employed and 7.0 milliliters toluene, 0.1 milliliter vanadium (V) oxychloride solution in toluene and variable amounts of (O—M)$_x$—(O—M')$_y$—OR compound were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. There-

TABLE 8

| Exp. number | Diluent Toluene (ml.) | Catalysts* Al(i-Bu)$_3$ (mmol) | VOCl$_4$ (mmol) | Raw material compositions for (O—M)$_x$—(O—M')$_y$—OR compounds Al-R compound | Mmol | H$_2$O (mmol) | Alcohol | Yield of alternating copolymer MEK soluble fraction (g.) | MEK insoluble diethyl ether soluble fraction (g.) |
|---|---|---|---|---|---|---|---|---|---|
| 1 | 6.5 | 1.0 | 0.1 | AlEt$_2$Cl | 0.05 | 0.025 | sec-BuOH Excess | 1.74 | 0.48 |
| 2 | 6.5 | 1.0 | 0.1 | AlEt$_2$Cl | 0.30 | 0.15 | sec-BuOH ...do..... | 0.95 | 0.66 |
| 3 | 6.5 | 1.0 | 0.1 | AlEtCl$_2$ | 1.00 | 0.50 | EtOH ...do..... | 1.57 | 0.35 |

*i-Bu=Isobutyl; Et=Ethyl; sec-Bu=sec-butyl.

Example 10

The usual, dry, air-free technique was employed and 7.5 milliliters toluene, 0.1 milliliter vanadium (V) oxychloride solution in toluene and 0.1 milliliter (O—M)$_x$—(O—M')$_y$—OR solution in toluene (1 molar solution) were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and a mixture of 2 milliafter the bottle was sealed and allowed to copolymerize at —30° C. for 16 hours. The results are summarized in Table 9.

The (O—M)$_x$—(O—M')$_y$—OR compound used in this example was prepared as follows:

The usual, dry, air-free technique was employed and a mixture of 5 millimoles water and 40 millimoles isopropylalcohol was added drop-wise into 10 milliliters triethylaluminum solution in toluene (1 molar solution) under agitation at —78° C. Then the mixture was agitated for 2 hours at 25° C. and refluxed for 12 hours. Thereafter the unreacted raw materials and reaction byproducts were removed from the mixture under vacuum and 1 molar toluene solution of the compound was prepared.

TABLE 9

| Exp. number | Diluent toluene (ml.) | Catalysts* Al(i-Bu)₃ (mmol) | VOCl₃ (mmol) | Raw material composition for (O—M)ₓ—(O—M')ᵧ—OR compound | | | | Yield of alternating copolymer | | [η]** (dl./g.) |
|---|---|---|---|---|---|---|---|---|---|---|
| | | | | AlEt₃ (mmol) | H₂O (mmol) | i-PrOH (mmol) | MEK soluble fraction (g.) | MEK insoluble diethyl ether soluble fraction (g.) | | |
| 1 | 7.0 | 1.0 | 0.1 | 0.05 | 0.025 | 0.20 | 0.87 | 0.96 | | 0.49 |
| 2 | 7.0 | 1.0 | 0.1 | 0.10 | 0.05 | 0.40 | 1.28 | 0.79 | | 0.48 |
| 3 | 7.0 | 1.0 | 0.1 | 0.30 | 0.15 | 1.20 | 0.18 | 2.28 | | 0.60 |
| 4 | 7.0 | 1.0 | 0.1 | 0.60 | 0.30 | 2.40 | 0.08 | 1.93 | | 0.68 |
| 5 | 7.0 | 1.0 | 0.1 | 1.00 | 0.50 | 4.00 | 0.11 | 0.24 | | 0.75 |

*i-Bu=Isobutyl; Et=Ethyl; i-Bu=Isobutyl.
**Intrinsic viscosity of MEK insoluble, diethyl ether soluble fraction measured in chloroform at 30° C.

Example 12

The usual, dry, air-free technique was employed and varying amounts of toluene, 0.1 milliliter vanadium (V) oxychloride solution in toluene (1 molar solution) and varying amounts of (O—M)ₓ—(O—M')ᵧ—OR compound prepared from M—OR compound and water were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 10.

the bottle was held in a low temperature bath at —78° C. and 0.5 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 11 Ref. 1–4 show the results obtained by using the catalyst whose third component is M—OR compound instead of (O—M)ₓ—(O—M')ᵧ—OR compound of this example. It is apparently found that the yield of high molecular weight alternating copolymer of butadiene and propylene (methyl ethyl ketone insoluble and diethyl ether soluble fraction) increased in this example.

TABLE 10

| Exp. number | Diluent toluene (ml.) | Catalysts* Al(i-Bu)₃ (mmol) | VOCl₃ (mmol) | Raw material compositions for (O—M)ₓ—(O—M')ᵧ—OR compound | | | Yield of alternating copolymer | |
|---|---|---|---|---|---|---|---|---|
| | | | | M—OR compound | Mmol | Water (mmol) | MEK soluble fraction (g.) | MEK insoluble, diethyl ether soluble fraction (g.) |
| 1 | 7.5 | 1.0 | 0.1 | Ti(Oi-Pr)₄ | 0.1 | 0.1 | 0.71 | 1.29 |
| Ref. 1 | 7.5 | 1.0 | 0.1 | Ti(Oi-Pr)₄ | 0.1 | | 0.42 | 0.89 |
| 2 | 7.0 | 1.0 | 0.1 | Ti(Oi-Pr)₄ | 0.6 | 0.6 | 0.15 | 2.09 |
| Ref. 2 | 7.0 | 1.0 | 0.7 | Ti(Oi-Pr)₄ | 0.6 | | Trace | Trace |
| 3 | 7.0 | 1.0 | 0.1 | B(OEt)₃ | 0.6 | 0.6 | 1.80 | 0.11 |
| Ref. 3 | 7.0 | 1.0 | 0.1 | B(OEt)₃ | 0.6 | | 0.05 | 0.01 |
| 4 | 7.0 | 1.0 | 0.1 | P(On-Bu)₃ | 0.6 | 0.6 | 1.63 | 0.13 |
| Ref. 4 | 7.0 | 1.0 | 0.1 | P(On-Bu)₃ | 0.6 | | 1.60 | 0.07 |
| 5 | 7.0 | 1.0 | 0.1 | VO(OEt)₃ | 0.6 | 0.6 | 1.46 | 0.41 |
| Ref. 5 | 7.0 | 1.0 | 0.1 | VO(OEt)₃ | 0.6 | | Trace | Trace |

*i-Bu=Isobutyl; i-Pr=Isopropyl; Et=Ethyl; n-Bu=n-Butyl.

Example 13

The usual, dry, air-free technique was employed and 7.5 milliliters toluene, 0.5 milliliter vanadium (V) oxychloride solution in toluene (0.1 molar solution) and varying amounts of (O—M)ₓ—(O—M')ᵧ—OR compound prepared from the carboxylate of M or M' atom and the compound having M—OR linkage were put successively in a 25 milliliters glass bottle at 25° C. Then the bottle was left alone at 25° C. for 10 minutes. Thereafter The (O—M)ₓ—(O—M')ᵧ—OR compound used in this example was prepared as follows:

The usual, dry, air-free technique was employed and varying amounts of carboxylate was added into aluminum triisopropoxide solution in toluene. Then the mixture was refluxed for 100 hours. Thereafter the unreacted raw materials and reaction byproducts were removed under vacuum and unreacted carboxylate insoluble in toluene was removed by filtration.

TABLE 11

| Exp. number | Diluent toluene (ml.) | Catalysts* Al(i-Bu)₃ (mmol) | VOCl₃ (mmol) | Raw material composition for (O—M)ₓ—(O—M')ᵧ—OR compound | | | | Yield of alternating copolymer | | [η]** (dl./g.) |
|---|---|---|---|---|---|---|---|---|---|---|
| | | | | Carboxylate | Mmol | M—OR compound | Mmol | MEK soluble fraction | MEK insoluble, diethyl ether soluble fraction (g.) | |
| 1 | 7.5 | 0.5 | 0.05 | Al₂O-(CH₃COO)₄ | 0.05/4 | Al(Oi-Pr)₃ | 0.05 | 1.41 | 0.61 | 0.55 |
| 2 | 7.5 | 0.5 | 0.05 | Al₂O-(CH₃COO)₄ | 0.15/4 | Al(Oi-Pr)₃ | 0.15 | 0.20 | 2.24 | 0.64 |
| 3 | 7.5 | 0.5 | 0.05 | Al₂O-(CH₃COO)₄ | 0.30/4 | Al(Oi-Pr)₃ | 0.30 | 0.16 | 2.18 | 0.67 |
| 4 | 7.5 | 0.5 | 0.05 | Al₂O-(CH₃COO)₄ | 0.50/4 | Al(Oi-Pr)₃ | 0.50 | 0.09 | 0.79 | 0.68 |
| 5 | 7.5 | 0.5 | 0.05 | OV(CH₃COO)₂ | 0.05/2 | Al(Oi-Pr)₃ | 0.05 | 0.88 | 0.93 | |
| 6 | 7.5 | 0.5 | 0.05 | OV(CH₃COO)₂ | 0.15/2 | Al(Oi-Pr)₃ | 0.15 | 0.25 | 1.56 | |
| 7 | 7.5 | 0.5 | 0.05 | OV(CH₃COO)₂ | 0.30/2 | Al(Oi-Pr)₃ | 0.30 | 0.12 | 1.80 | 0.81 |

See footnotes at end of table.

TABLE 11—Continued

| Exp. number | Diluent toluene (ml.) | Catalysts* Al(i-Bu)₃ (mmol) | VOCl₃ (mmol) | Raw material composition for (O—M)ₓ—(O—M')ᵧ—OR compound Carboxylate | Mmol | M—OR compound | Mmol | Yield of alternating copolymer MEK soluble fraction | MEK insoluble, diethyl ether soluble fraction (g.) | [η]** (dl./g.) |
|---|---|---|---|---|---|---|---|---|---|---|
| 8 | 7.5 | 0.5 | 0.05 | Zn(CH₃COO)₂ | 0.15/2 | Al(Oi-Pr)₃ | 0.15 | 0.31 | 1.55 | -------- |
| 9 | 7.5 | 0.5 | 0.05 | Zr(CH₃COO)₄ | 0.05/4 | Al(Oi-Pr)₃ | 0.05 | 0.61 | 0.73 | -------- |
| 10 | 7.5 | 0.5 | 0.05 | Zr(CH₃COO)₄ | 0.15/4 | Al(Oi-Pr)₃ | 0.15 | 0.06 | 1.91 | 0.67 |
| 11 | 7.5 | 0.5 | 0.05 | Zr(CH₃COO)₄ | 0.30/4 | Al(Oi-Pr)₃ | 0.30 | 0.04 | 1.95 | 0.67 |
| 12 | 7.5 | 0.5 | 0.05 | Mn(CH₃COO)₂ | 0.15/2 | Al(Oi-Pr)₃ | 0.15 | 0.16 | 1.14 | 0.67 |
| 13 | 7.5 | 0.5 | 0.05 | Pb(CH₃COO)₂ | 0.15/2 | Al(Oi-Pr)₃ | 0.15 | 0.19 | 1.05 | -------- |
| Ref. 1 | 7.5 | 0.5 | 0.05 | ---------- | ---- | Al(Oi-Pr)₃ | 0.05 | 0.29 | 0.46 | -------- |
| Ref. 2 | 7.5 | 0.5 | 0.05 | ---------- | ---- | Al(Oi-Pr)₃ | 0.15 | 0.06 | 0.56 | -------- |
| Ref. 3 | 7.5 | 0.5 | 0.05 | ---------- | ---- | Al(Oi-Pr)₃ | 0.30 | 0.04 | 0.83 | -------- |
| Ref. 4 | 6.5 | 0.5 | 0.05 | ---------- | ---- | Al(Oi-Pr)₃ | 0.50 | 0.30 | 0.09 | -------- |

* i-Pr=Isopropyl.
** Intrinsic viscosity of MEK insoluble, diethyl ether soluble fraction measured in chloroform at 30° C.

Example 14

The usual, dry, air-free technique was employed and 7.5 milliliters toluene, 0.5 milliliter vanadium (V) oxychloride solution in toluene (0.1 molar solution) and varying amounts of (O—M)ₓ—(O—M')ᵧ—OR compound prepared from carboxylate and the compound having M—OR linkage were put successively in a 25 milliliters glass bottle at 25° C. Then the bottle was left alone at 25° C. for 10 minutes. Thereafter the bottle was held in a low temperature bath at —78° C. and 0.5 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 12. It is found that by using (O—M)ₓ—(O—M')ᵧ—OR compound as the third component of the catalyst instead of M—OR compound the yield of the high molecular weight alternating copolymer increased.

TABLE 12

| Exp. number | Diluent toluene (ml.) | Catalysts* Al(i-Bu)₃ (mmol) | VOCl₃ (mmol) | Raw material composition for (O—M)ₓ—(O—M')ᵧ—OR compound Carboxylate | Mmol | M—OR compound | Mmol | Yield of alternating copolymer MEK soluble fraction | MEK insoluble, diethyl ether soluble fraction (g.) | [η]** (dl./g.) |
|---|---|---|---|---|---|---|---|---|---|---|
| 1 | 7.5 | 0.5 | 0.05 | Cd(CH₃COO)₂ | 0.025 | P(OC₆H₅)₃ | 0.05 | 1.50 | 0.23 | -------- |
| Ref. 1 | 7.5 | 0.5 | 0.05 | ---------- | 0.025 | P(OC₆H₅)₃ | 0.05 | 1.71 | 0.19 | -------- |
| 2 | 7.5 | 0.5 | 0.05 | Cd(CH₃COO)₂ | 0.075 | P(OC₆H₅)₃ | 0.15 | 0.96 | 0.60 | -------- |
| Ref. 2 | 7.5 | 0.5 | 0.05 | ---------- | 0.075 | P(OC₆H₅)₃ | 0.15 | 1.09 | 0.41 | -------- |
| 3 | 7.5 | 0.5 | 0.05 | Cd(CH₃COO)₂ | 0.15 | P(OC₆H₅)₃ | 0.30 | 0.78 | 1.31 | -------- |
| Ref. 3 | 7.5 | 0.5 | 0.05 | ---------- | 0.15 | P(OC₆H₅)₃ | 0.30 | 0.85 | 1.05 | -------- |
| 4 | 7.5 | 0.5 | 0.05 | Cd(CH₃COO)₂ | 0.25 | P(OC₆H₅)₃ | 0.50 | 0.48 | 2.00 | 0.42 |
| Ref. 4 | 7.5 | 0.5 | 0.05 | ---------- | 0.25 | P(OC₆H₅)₃ | 0.50 | 0.51 | 1.69 | -------- |

* C₆H₅=Phenyl.
** Intrinsic viscosity of MEK insoluble, diethyl ether soluble fraction measured in chloroform at 30° C.

Example 15

The usual, dry, air-free technique was employed and 7.5 milliliters toluene, 0.5 milliliter vanadium (V) oxychloride solution in toluene (0.1 molar solution) and varying amounts of (O—M)ₓ—(O—M')ᵧ—OR compound prepared from carboxylate and the compound having M—OR linkage were put successively in a 25 milliliters glass bottle at 25° C. Then the bottle was left alone at 25° C. for 10 minutes. Thereafter the bottle was held in a low temperature bath at —78° C. and 0.5 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 13.

TABLE 13

| Exp. number | Diluent toluene (ml.) | Catalysts* Al(i-Bu)₃ (mmol) | VOCl₃ (mmol) | Raw material composition for (O—M)ₓ—(O—M')ᵧ—OR compound Carboxylate | Mmol | M—OR compound | Mmol | Yield of alternating copolymer MEK soluble fraction (g.) | MEK insoluble, diethyl ether soluble fraction (g.) |
|---|---|---|---|---|---|---|---|---|---|
| 1 | 7.5 | 0.6 | 0.05 | OV(CH₃COO)₂ | 0.15 | Si(OC₂H₅)₄ | 0.30 | 1.65 | 0.26 |
| Ref. 1 | 7.5 | 0.5 | 0.05 | ---------- | ---- | Si(OC₂H₅)₄ | 0.30 | 0.13 | 0.17 |
| 2 | 7.5 | 0.5 | 0.05 | OV(CH₃COO)₂ | 0.25 | Si(OC₂H₅)₄ | 0.50 | 0.33 | 0.72 |
| Ref. 2 | 7.5 | 0.5 | 0.05 | ---------- | ---- | Si(OC₂H₅)₄ | 0.50 | Trace | Trace |

* i-Bu=Isobutyl.

Example 16

The usual, dry, air-free technique was employed and 7.5 milliliters toluene, 0.5 milliliter vanadium (V) oxychloride solution in toluene (0.1 molar solution) and 0.15 milliliter $(O-M)_x-(O-M')_y-OR$ compound (prepared from 2 moles titanium tetra-n-butoxide and 1 mole copper acetate) solution in toluene (1 molar solution based on titanium tetra-n-butoxide) were put successively in a 25 milliliters glass bottle at 25° C. Then the bottle was left alone at 25° C. for 10 minutes. Thereafter the bottle was held in a low temperature bath at −78° C. and 0.5 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours.

The yield of methyl ethyl ketone soluble alternating copolymer of butadiene and propylene was 0.99 g. and that of methyl ethyl ketone insoluble and diethyl ether soluble alternating copolymer, i.e. high molecular weight copolymer of butadiene and propylene was 0.22 g. On the other hand, when 0.15 millimole titanium tetra-n-butoxide was used as the third component of the catalyst, the yield of the former fraction was 0.02 g. and that of latter fraction was 0.01 g.

Example 17

The usual, dry, air-free technique was employed and 6.0 milliliters toluene, 0.1 millimole V—X compound, varying amounts of M—OR compound and varying amounts of halogen compound were put successively in a 25 milliliters glass bottle at 25° C. Then the bottle was left alone at 25° C. for 10 minutes. Thereafter the bottle was held in a low temperature bath at −78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 14.

TABLE 14

| Experiment number | Diluent toluene | Al(i-Bu)₃ (mmol) | V-X compound | Mmol | M-OR compound | Mmol | Halogen compound | Mmol | MEK soluble fraction (g.) | MEK insoluble, diethyl ether soluble fraction (g.) |
|---|---|---|---|---|---|---|---|---|---|---|
| 1 | 6.0 | 1.0 | VOCl₃ | 0.1 | Al(Oi-Pr)₃ | 1.2 | TiCl₄ | 0.08 | 0.13 | 0.71 |
| 2 | 6.0 | 1.0 | VOCl₃ | 0.1 | Al(Oi-Pr)₃ | 1.2 | SnCl₄ | 0.08 | 0.05 | 1.37 |
| 3 | 6.0 | 1.0 | VOCl₃ | 0.1 | Al(Oi-Pr)₃ | 1.2 | Tert-BuCl | 0.30 | 0.06 | 1.96 |
| 4 | 6.0 | 1.0 | VOCl₃ | 0.1 | Al(Oi-Pr)₃ | 1.2 | AlCl(Oi-Pr)₂ | 0.30 | 0.04 | 2.46 |
| 5 | 6.0 | 1.0 | VOCl₃ | 0.1 | Al(Oi-Pr)₃ | 1.2 | I₂ | 0.15 | 0.03 | 0.27 |
| 6 | 6.0 | 1.0 | VOCl₃ | 0.1 | Al(Oi-Pr)₃ | 1.2 | AlCl₃ | 0.10 | 0.05 | 2.38 |
| 7 | 6.0 | 1.0 | VOCl₃ | 0.1 | Al(Oi-Pr)₃ | 1.2 | CuCl | 0.50 | 0.02 | 0.33 |
| 8 | 6.0 | 1.0 | VOCl₃ | 0.1 | Al(Oi-Pr)₃ | 1.2 | ZnCl₂ | 0.30 | 0.11 | 0.32 |
| 9 | 6.0 | 1.0 | VOCl₃ | 0.1 | Al(Oi-Pr)₃ | 1.2 | MgCl₂ | 0.30 | 0.04 | 0.32 |
| 10 | 6.0 | 1.0 | VOCl₃ | 0.1 | Al(Oi-Pr)₃ | 1.2 | SbCl₅ | 0.05 | 0.05 | 0.42 |
| 11 | 6.0 | 1.0 | VLCl₃ | 0.1 | Al(Oi-Pr)₃ | 1.2 | MnCl₂ | 0.30 | 0.03 | 0.42 |
| Ref. 1 | 6.0 | 1.0 | VOCl₃ | 0.1 | Al(Oi-Pr)₃ | 1.2 | | | 0.12 | 0.11 |
| 12 | 6.0 | 1.0 | VCl₄ | 0.1 | Al(Oi-Pr)₃ | 1.0 | SnCl₄ | 0.08 | 0.03 | 1.46 |
| Ref. 2 | 6.0 | 1.0 | VCl₄ | 0.1 | Al(Oi-Pr)₃ | 1.0 | | | 0.08 | 0.13 |
| 13 | 6.0 | 1.0 | VOCl₃ | 0.1 | B(OC₆H₅)₃ | 0.2 | SnCl₄ | 0.08 | 0.83 | 1.24 |
| Ref. 3 | 6.0 | 1.0 | VOCl₃ | 0.1 | B(OC₆H₅)₃ | 0.2 | | | 0.70 | 1.00 |
| 14 | 6.0 | 1.0 | VOCl₃ | 0.1 | P(OC₆H₅)₃ | 0.2 | TiCl₄ | 0.08 | 0.93 | 1.15 |
| Ref. 4 | 6.0 | 1.0 | VOCl₃ | 0.1 | P(OC₆H₅)₃ | 0.2 | | | 0.55 | 0.30 |

*i-Pr=Isopropyl; C₆H₅=Phenyl; i-Bu=Isobutyl; Tert-BuCl=Tert-butyl chloride.

Example 18

The usual, dry, air-free technique was employed and 6.0 milliliters toluene, 0.1 millimole V—X compound, varying amounts of M—OR compound and varying amounts of halogen compound were put successively in a 25 milliliters glass bottle at 25° C. Then the bottle was left alone at 25° C. for 10 minutes. Thereafter the bottle was held in a low temperature bath at −78° C. and varying amounts of triisobutylaluminum solution in toluene (1 molar solution) and a mixture of 2 milliliters liquid propylene, 2 milliliters liquid butadiene and 2 milliliters touene were put successively into the bottle also employing the usual, dry, air-free technique. Thereafter the bottle was sealed and allowed to copolymerize at −30° C. for 39 hours. The results are summarized in Table 15.

TABLE 15

| Exp. number | Diluent toluene (ml.) | Al(i-Bu)₃ (mmol) | V-X compound | Mmol | M-OR compound | Mmol | Halogen compound | Mmol | MEK soluble fraction (g.) | MEK insoluble, diethyl ether soluble fraction (g.) |
|---|---|---|---|---|---|---|---|---|---|---|
| 1 | 6.0 | 2.0 | VOCl₃ | 0.1 | Ti(OC₄H₉)₄ | 0.8 | PCl₅ | 0.06 | 0.12 | 0.10 |
| Ref. 1 | 6.0 | 2.0 | VOCl₃ | 0.1 | Ti(OC₄H₉)₄ | 0.8 | | | 0.02 | Trace |
| 2 | 6.0 | 1.0 | VOCl₃ | 0.1 | NaOEt | 2.0 | TiCl₄ | 0.08 | 0.54 | 0.53 |
| Ref. 2 | 6.0 | 1.0 | VOCl₃ | 0.1 | NaOEt | 2.0 | | | 0.61 | 0.20 |
| 3 | 6.0 | 1.0 | VCl₄ | 0.1 | P(OC₆H₅)₃ | 0.5 | SnCl₄ | 0.08 | 0.80 | 1.10 |
| Ref. | 6.0 | 1.0 | VCl₄ | 0.1 | P(OC₆H₅)₃ | 0.5 | | | 0.56 | 0.83 |

*i-Bu=Isobutyl; C₄H₉=n-Butyl; Et=Ethyl; C₆H₅=Phenyl.

Example 19

The usual, dry, air-free technique was employed and 6.0 milliliters toluene, 0.1 millimole vanadium (V) oxychloride, 0.5 millimole M—OR compound and varying amounts of halogen compound were put successively in a 25 milliliters glass bottle at 25° C. Then the bottle was left alone at 25° C. for 10 minutes. Thereafter the bottle was held in a low temperature bath at −78° C. and 1.0 milliliter diethylaluminum monochloride solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. The results are summarized in Table 16.

TABLE 16

| Exp. No. | Polymerization internal (hr.) | Catalysts* | | | | | | Yield of alternating copolymer | |
|---|---|---|---|---|---|---|---|---|---|
| | | AlEt$_2$Cl (mmol) | VOCl$_3$ (mmol) | M-OR compound | Mmol | Halogen compound | Mmol | MEK soluble fraction (g.) | MEK insoluble diethy, ether soluble fraction (g.) |
| 1 | 16 | 1.0 | 0.1 | Al(Oi-Pr)$_3$ | 0.5 | TiCl$_4$ | 0.05 | 0.01 | 0.11 |
| Ref | 16 | 1.0 | 0.1 | Al(Oi-Pr)$_3$ | 0.5 | | | 0.05 | 0.03 |
| 2 | 20 | 1.0 | 0.1 | P(OC$_6$H$_5$)$_3$ | 0.5 | SnCl$_4$ | 0.08 | 0.03 | 0.12 |
| Ref. 2 | 20 | 1.0 | 0.1 | P(OC$_6$H$_5$)$_3$ | 0.5 | | | 0.02 | 0.05 |

*i-Bu=Isobutyl, i-Pr=Isopropyl; C$_6$H$_5$=Phenyl.

Example 20

The usual, dry, air-free technique was employed and 6.0 milliliters toluene, 0.1 millimole vanadium (V) oxychloride and 1.2 millimoles aluminum triisopropoxide were put successively in a 25 milliliters glass bottle at 25° C. Then the bottle was held in a low temperature bath at −78° C. and a mixture of 1.0 milliliter triisobutylaluminum solution in toluene (1 molar solution) and 0.15 milliliter of ethylaluminum dichloride solution in toluene (1 molar solution) and a mixture of 2 milliliters liquid porpylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble fraction of the alternating copolymer was 0.06 g. and that of methyl ethyl ketone insoluble and diethyl ether soluble fraction of the copolymer, i.e. high molecular weight copolymer was 0.38 g. When the catalyst involving no ethylaluminumdichloride as the fourth component, the yield of the latter fraction was 0.11 g.

Example 21

The usual, dry, air-free technique was employed and varying amounts of metal oxide or metalloid oxide, 7.5 milliliters toluene, 0.5 milliliter vanadium (V) oxychloride solution in toluene (0.1 molar solution) and 0.15 millimole aluminum triisopropoxide were put successively in a 25 milliliters glass bottle at 25° C. Then the bottle was left alone at 25° C. for 10 minutes. Thereafter the bottle was held in a low temperature bath at −78° C. and 0.5 milliliter triisobutylaluminum solution in toluene (1 molar solution) and a mixture of 2 milliliters liquid propylene, 2 milliliters liquid butadiene and milliliters toluene were put successively into the bottle also employing the usual, dry, air-free technique. Thereafter the bottle was sealed and allowed to compolymerize at −30° C. for 16 hours. The results are summarized in Table 17. It is found that by using the four components catalyst system the yield of the high molecular weight alternating copolymer increased.

TABLE 17

| Exp. number | Diluent toluene (ml) | Catalysts* | | | | | | Yield of alternating copolymer | | |
|---|---|---|---|---|---|---|---|---|---|---|
| | | Al(i-Bu)$_3$ (mmol) | VOCl$_3$ (mmol) | M—OR compound | Mmol | Metal oxide or metalloid oxide | g. | MEK soluble fraction (g.) | MEK insoluble, diethyl ether soluble fraction (g.) | [η]** (dl./g.) |
| 1 | 7.5 | 0.5 | 0.05 | Al(Oi-Pr)$_3$ | 0.15 | MgO | 0.02 | 0.09 | 1.20 | |
| 2 | 7.5 | 0.5 | 0.05 | Al(Oi-Pr)$_3$ | 0.15 | ZnO | 0.02 | 0.13 | 1.80 | |
| 3 | 7.5 | 0.5 | 0.05 | Al(Oi-Pr)$_3$ | 0.15 | Al$_2$O$_3$ | 0.02 | 0.10 | 1.26 | 0.96 |
| 4 | 7.5 | 0.5 | 0.05 | Al(Oi-Pr)$_3$ | 0.15 | Silica-alumina | 0.02 | 0.14 | 0.85 | |
| 5 | 7.5 | 0.5 | 0.05 | Al(Oi-Pr)$_3$ | 0.15 | B$_2$O$_3$ | 0.02 | 0.08 | 1.19 | |
| 6 | 7.5 | 0.5 | 0.05 | Al(Oi-Pr)$_3$ | 0.15 | TiO$_2$ | 0.02 | 0.09 | 1.74 | 0.68 |
| 7 | 7.5 | 0.5 | 0.05 | Al(Oi-Pr)$_3$ | 0.15 | SiO$_2$ | 0.02 | 0.10 | 0.75 | |
| 8 | 7.5 | 0.5 | 0.05 | Al(Oi-Pr)$_3$ | 0.15 | Synthetic zeolite | 0.02 | 0.09 | 1.48 | 0.67 |
| 9 | 7.5 | 0.5 | 0.05 | Al(Oi-Pr)$_3$ | 0.15 | Natural zerolite | 0.02 | 0.08 | 1.25 | 0.68 |
| 10 | 7.5 | 0.5 | 0.05 | Al(Oi-Pr)$_3$ | 0.15 | V$_2$O$_5$ | 0.02 | 0.11 | 1.56 | |
| Ref | 7.5 | 0.5 | 0.05 | Al(Oi-Pr)$_3$ | 0.15 | | | 0.06 | 0.56 | |

*Silica-alumina=SiO$_2$/Al$_2$O$_3$ (80/20); Synthetic zeolite=Y-type; i-Pr=Isopropyl.
**Intrinsic viscosity of MEK insoluble, diethyl ether soluble fraction measured in chloroform at 30°C.

Example 22

The usual, dry, air-free technique was employed and varying amounts of metal oxide or metalloid oxide, 7.5 milliliters toluene, varying amounts of M—OR compound and 0.1 milliliter vanadium (V) oxychloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 10 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter, the bottle was sealed and allowed to copolymerize at −30° C. for 16 hours. The results are summarized in Table 18. It is found that by using the four components catalyst system the yield of the high molecular weight alternating copolymer increased.

TABLE 18

| Exp. number | Diluent toluene (ml.) | Catalysts* | | | | | Yield of alternating copolymer | |
|---|---|---|---|---|---|---|---|---|
| | | Al(i-Bu)₃ (mmol) | VOCl₃ (mmol) | M—OR compound | Mmol | Metal oxide or metalloid oxide | G. | MEK soluble fraction (g.) | MEK insoluble, diethyl ether soluble fraction (g.) |
| 1 | 7.5 | 1.0 | 0.1 | Ti(Oi-Pr)₄ | 0.1 | V₂O₅ | 0.04 | 0.69 | 1.34 |
| 2 | 7.5 | 1.0 | 0.1 | Ti(Oi-Pr)₄ | 0.1 | Silica-alumina | 0.04 | 0.56 | 1.21 |
| 3 | 7.5 | 1.0 | 0.1 | Ti(Oi-Pr)₄ | 0.1 | Synthetic zeolite | 0.04 | 0.62 | 0.93 |
| Ref. 1 | 7.5 | 1.0 | 0.1 | Ti(Oi-Pr)₄ | 0.1 | | | 0.42 | 0.89 |
| 4 | 7.5 | 1.0 | 0.1 | B(OEt)₃ | 0.1 | SiO₂ | 0.04 | 1.43 | 0.39 |
| Ref. 2 | 7.5 | 1.0 | 0.1 | B(OEt)₃ | 0.1 | | | 1.52 | 0.20 |
| 5 | 7.5 | 1.0 | 0.1 | P(On-Bu)₃ | 0.1 | ZnO | 0.04 | 1.86 | 0.22 |
| Ref. 3 | 7.5 | 1.0 | 0.1 | P(On-Bu)₃ | 0.1 | | | 2.11 | 0.14 |
| 6 | 7.5 | 1.0 | 0.1 | Si(OEt)₄ | 0.1 | MgO | 0.04 | 2.00 | 0.15 |
| Ref. 4 | 7.5 | 1.0 | 0.1 | Si(OEt)₄ | 0.1 | | | 2.03 | 0.10 |
| 7 | 7.5 | 1.0 | 0.1 | OV(OEt)₃ | 0.1 | B₂O₃ | 0.04 | 1.42 | 0.49 |
| Ref. 5 | 7.5 | 1.0 | 0.1 | OV(OEt)₃ | 0.1 | | | 1.53 | 0.31 |
| 8 | 7.5 | 1.0 | 0.1 | Na(OEt)₃ | 0.1 | TiO₂ | 0.04 | 2.10 | 0.07 |
| Ref. 6 | 7.5 | 1.0 | 0.1 | Na(OEt)₃ | 0.1 | | | 1.87 | 0.02 |

*Silica-alumina=SiO₂/Al₂O₃(80/20); i-Pr=Isopropyl; Et=Ethyl.

Example 23

The usual, dry, air-free technique was employed and varying amounts of halogen or halogen compound, 7.5 milliliters toluene, 0.5 milliliter vanadium (V) oxychloride solution in toluene (0.1 molar solution) and

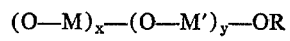

compound made from 0.15 millimole aluminum triisopropoxide and 0.075 millimole water were put successively in a 25 milliliters glass bottle at 25° C. Then the botttle was left alone at 25° C. for 10 minutes. Thereafter the bottle was held in a low temperature bath at —78° C. and 0.25 milliliter triisobutyaluminum solution in toluene and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at —30° C. for 16 hours. The results are summarized in Table 19. It was found that by using the four components catalyst system the yield of the high molecular weight alternating copolymer increased.

Example 24

The usual, dry, air-free technique was employed and varying amounts of halogen or halogen compound, 7.0 milliliters toluene, 0.5 milliliter vanadium (V) oxychloride solution in toluene (0.1 molar solution) and

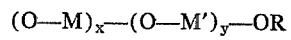

compound made from 0.5 millimole aluminum triisopropoxide and 0.125 millimole water were put successively in a 25 milliliters glass bottle at 25° C. Then the bottle was left alone at 25° C. for 10 minutes. Thereafter the bottle was held in a low temperature bath at —78° C. and 0.5 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Then the bottle was sealed and allowed to copolymerize at —30° C. for 15 hours and then at 0° C. for 26 hours. The results are summarized in Table 20. It is found that by using the four components catalyst system the yield of the high molecular weight alternating copolymer increased.

TABLE 20

| Exp. number | Diluent toluene (ml.) | Catalysts* | | | | | | | Yield of alternating copolymer | |
|---|---|---|---|---|---|---|---|---|---|---|
| | | Al(i-Bu)₃ (mmol) | OCl₃ (mmol) | Raw material composition for (O—M)ₓ—(O—M')ᵧ—OR compound | | | Halogen compound | | MEK soluble fraction (g.) | MEK insoluble diethyl ether soluble fraction (g.) |
| | | | | M—OR compound | Mmol | H₂O (mmol) | | | | |
| 1 | 7.0 | 0.5 | 0.05 | Al(Oi-Pr)₃ | 0.5 | 0.125 | TiCl₄, mmol | 0.025 | 0.11 | 0.10 |
| 2 | 7.0 | 0.5 | 0.05 | Al(Oi-Pr)₃ | 0.5 | 0.125 | SnCl₄, mmol | 0.025 | 0.08 | 0.27 |
| 3 | 7.0 | 0.5 | 0.05 | Al(Oi-Pr)₃ | 0.5 | 0.125 | Tert-BuCl, ml | 0.010 | 0.10 | 0.16 |
| 4 | 7.0 | 0.5 | 0.05 | Al(Oi-Pr)₃ | 0.5 | 0.125 | AlCl(Oi-Pr)₂, mmol | 0.100 | 0.12 | 0.15 |
| 5 | 7.0 | 0.5 | 0.05 | Al(Oi-Pr)₃ | 0.5 | 0.125 | I₂, g | 0.043 | 0.07 | 0.21 |
| 6 | 7.0 | 0.5 | 0.05 | Al(Oi-Pr)₃ | 0.5 | 0.125 | FeCl₃, g | 0.005 | 0.03 | 0.12 |
| 7 | 7.0 | 0.5 | 0.05 | Al(Oi-Pr)₃ | 0.5 | 0.125 | BF₃·OEt₂, mmol | 0.035 | 0.13 | 0.06 |
| 8 | 7.0 | 0.5 | 0.05 | Al(Oi-Pr)₃ | 0.5 | 0.125 | ZnI₂, g | 0.016 | 0.12 | 0.11 |
| 9 | 7.0 | 0.5 | 0.05 | Al(Oi-Pr)₃ | 0.5 | 0.125 | MgCl₂, g | 0.010 | 0.15 | 0.17 |
| 10 | 7.0 | 0.5 | 0.05 | Al(Oi-Pr)₃ | 0.5 | 0.125 | Cu₂Cl₂, g | 0.010 | 0.13 | 0.13 |
| 11 | 7.0 | 0.5 | 0.05 | Al(Oi-Pr)₃ | 0.5 | 0.125 | CoBr₂, g | 0.007 | 0.06 | 0.11 |
| 12 | 7.0 | 0.5 | 0.05 | Al(Oi-Pr)₃ | 0.5 | 0.125 | AlEtCl₂, mmol | 0.050 | 0.15 | 0.09 |
| 13 | 7.0 | 0.5 | 0.05 | Al(Oi-Pr)₃ | 0.5 | 1.125 | PCl₅, g | 0.004 | 0.03 | 0.10 |
| Ref. 1 | 7.0 | 0.5 | 0.05 | Al(Oi-Pr)₃ | 0.5 | 0.125 | | | 0.06 | 0.03 |

* i-Pr=Isopropyl; Tert-BuCl=Tert-butyl chloride; Et=Ethyl.

TABLE 19

| Experiment number | Diluent toluene (ml.) | Catalysts* | | | | | | | Yield of alternating copolymer | |
|---|---|---|---|---|---|---|---|---|---|---|
| | | Al(i-Bu)₃ (mmol) | VOCl₃ (mmol) | Raw material composition for (O-M)ₓ-(O-M')ᵧ-compound | | | Halogen compound | | MEK soluble fraction (g.) | MEK insoluble, diethyl ether soluble (g.) |
| | | | | M-OR compound | Mmol | H₂O (mmol) | | | | |
| 1 | 7.5 | 0.25 | 0.05 | Al(Oi-Pr)₃ | 0.15 | 0.075 | I₂, g | 0.025 | 0.19 | 1.58 |
| 2 | 7.5 | 0.25 | 0.05 | Al(Oi-Pr)₃ | 0.15 | 0.075 | AlCl, (Oi-Pr)₂, mmol. | 0.2 | 0.06 | 1.27 |
| 3 | 7.5 | 0.52 | 0.05 | Al(Oi-Pr)₃ | 0.15 | 0.075 | AlCl₃, g | 0.01 | 0.10 | 1.33 |
| Ref | 7.5 | 0.25 | 0.05 | Al(Oi-Pr)₃ | 0.15 | 0.075 | | | 0.07 | 1.01 |

*i-Bu=Isobutyl; i-Pr=Isopropyl

Example 25

The usual, dry, air-free technique was employed and 7.5 milliliters toluene, 0.05 millimole halogen or halogen compond, $(O-M)_x-(O-M')_y-OR$ compound made from 0.6 millimole M—OR compound and 0.6 millimole water and 0.1 millimole vanadium (V) oxychloride solution in toluene (1 molar solution) were put successively in a 25 milliliters glass bottle at 25° C. Then the bottle was left alone at 25° C. for 10 minutes. Thereafter the bottle was held in a low temperature bath at −78° C. and 1.0 milliliter triisobutylaluminum solution in toluene (1 molar solution) and a mixture of 2 millilters liquid propylene, 2 milliliters liquid butadiene and 2 milliliters toluene were put successively into the bottle also employing the usual dry, air-free technique. Thereafter the bottle was put successively into the bottle also employing the usual, dry, air-free technique. Thereafter the bottle was sealed and allowed to copolymerize at −30° C. for 16 hours. The results are summarized in Table 22. It is found that by using the four components catalyst system the yield of the alternating copolymer increased.

The $(O-M)_x-(O-M')_y-OR$ compound used in this example was prepared as follows:

The usual, dry, air-free technique was employed and 0.5 molar equivalent of carboxylate was added into 1 mole of M—OR compound solution in toluene. Then the mixture was refluxed for 100 hours. Thereafter the unreacted raw materials and reaction byproducts were removed under vacuum and unreacted carboxylate insoluble toluene was removed by filtration.

TABLE 22

| Exp. number | Diluent toluene (ml.) | Al(i-Bu)₃ (mmol) | VOCl₃ (mmol) | Carboxylate | Mmol | M—OR compound | Mmol | Halogen compound | Mmol | MEK soluble fraction (g.) | MEK insoluble, diethyl ether soluble fraction (g.) |
|---|---|---|---|---|---|---|---|---|---|---|---|
| 1 | 7.5 | 0.5 | 0.05 | Cu(CH₃COO)₂ | 0.075 | Ti(On-Bu)₄ | 0.15 | AlCl₃·OEt₂ | 0.02 | 0.22 | 1.68 |
| Ref. 1 | 7.5 | 0.5 | 0.05 | Cu(CH₃COO)₂ | 0.075 | Ti(On-Bu)₄ | 0.15 | | | 0.99 | 0.22 |
| 2 | 7.5 | 0.5 | 0.05 | Ca(CH₃COO)₂ | 0.075 | Ti(On-Bu)₄ | 0.15 | SnCl₄ | 0.02 | 0.03 | 0.56 |
| Ref. 2 | 7.5 | 0.5 | 0.05 | Ca(CH₃COO)₂ | 0.075 | Ti(On-Bu)₄ | 0.15 | | | 0.04 | 0.04 |
| 3 | 7.5 | 0.5 | 0.05 | Co(CH₃COO)₂ | 0.075 | B(OC₆H₅)₃ | 0.15 | I₂ | 0.20 | 0.42 | 1.15 |
| Ref. 3 | 7.5 | 0.5 | 0.05 | Co(CH₃COO)₂ | 0.075 | B(OC₆H₅)₃ | 0.15 | | | 0.23 | 0.73 |

*n-Bu=n-Butyl; C₆H₅=Phenyl.

sealed and allowed to copolymerize at −30° C. for 16 hours. The results are summarized in Table 21. It is found that by using the four components catalyst system the yield of the alternating copolymer increased.

Example 27

The usual, dry, air-free technique was employed and 0.05 g. metal oxide or metalloid oxide, 7 milliliters toluene, varying amounts of $(O-M)_x-(O-M')_y-OR$

TABLE 21

| Exp. number | Diluent toluene | Al(i-Bu)₃ (mmol) | VOCl₃ (mmol) | M—OR compound | Mmol | H₂O (mmol) | Halogen compound | Mmol | MEK soluble fraction (g.) | MEK insoluble, diethyl soluble fraction (g.) |
|---|---|---|---|---|---|---|---|---|---|---|
| 1 | 7.5 | 1.0 | 0.1 | B(OEt)₃ | 0.6 | 0.6 | TiCl₄ | 0.05 | 1.83 | 0.25 |
| Ref. 1 | 7.5 | 1.0 | 0.1 | B(OEt)₃ | 0.6 | 0.6 | | | 1.80 | 0.11 |
| 2 | 7.5 | 1.0 | 0.1 | P(On-Bu)₃ | 0.6 | 0.6 | SnCl₄ | 0.05 | 1.65 | 0.18 |
| 3 | 7.5 | 1.0 | 0.2 | P(On-Bu)₃ | 0.6 | 0.6 | Br₂ | 0.05 | 1.70 | 0.15 |
| Ref. 2 | 7.5 | 1.0 | 0.1 | P(On-Bu)₃ | 0.6 | 0.6 | | | 1.63 | 0.13 |
| 4 | 7.5 | 1.0 | 0.1 | Ti(On-Bu)₄ | 0.6 | 0.6 | Tert-BuCl | 0.05 | 0.09 | 2.20 |
| 5 | 7.5 | 1.0 | 0.1 | Ti(On-Bu)₄ | 0.6 | 0.6 | BF₃·OEt₂ | 0.05 | 0.08 | 2.72 |
| Ref. 3 | 7.5 | 1.0 | 0.1 | Ti(On-Bu)₄ | 0.6 | 0.6 | | | 0.15 | 2.09 |
| 6 | 7.5 | 1.0 | 0.1 | Si(OEt)₄ | 0.6 | 0.6 | I₂ | 0.05 | 1.98 | 0.36 |
| 7 | 7.5 | 1.0 | 0.1 | Si(OEt)₄ | 0.6 | 0.6 | AlEtCl₂ | 0.05 | 1.86 | 0.20 |
| Ref. 4 | 7.5 | 1.0 | 0.1 | Si(OEt)₄ | 0.6 | 0.6 | | | 1.87 | 0.16 |
| 8 | 7.5 | 1.0 | 0.1 | OV(OEt)₃ | 0.6 | 0.6 | AlCl₃·OEt₂ | 0.05 | 1.99 | 0.52 |
| Ref. 5 | 7.5 | 1.0 | 0.1 | OV(OEt)₃ | 0.6 | 0.6 | | | 1.46 | 0.41 |

* Et=Ethyl; n-Bu=n-Butyl; Tert-BuCl=tert-butyl chloride.

Example 26

The usual, dry, air-free technique was employed and 7.5 milliliters toluene, 0.5 milliliter vanadium (V) oxychloride solution in toluene (0.1 molar solution), $$(O-M)_x-(O-M')_y-OR$$

compound made from 0.075 millimole carboxylate and 0.15 millimole M—OR compound and 0.02 millimole halogen or halogen compound were put successively in a 25 milliliters glass bottle at 25° C. Then the bottle was left alone at 25° C. for 10 minutes. Thereafter the bottle was held in a low temperature bath at −78° C. and 0.5 milliliter triisobutylaluminum solution in toluene (1 molar solution) and a mixture of 2 milliliters liquid propylene, 2 milliliters liquid butadiene and 2 milliliters toluene were compound made from M—OR compound and water and 0.1 millilter vanadium (V) oxychloride solution in toluene (1 molar solution) were put successively in a 25 milliliters glass bottle at 25° C. Then the bottle was left alone at 25° C. for 10 minutes. Thereafter the bottle was held in a low temperature bath at −78° and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The results are summarized in Table 23. It is found that by using the four components catalyst system the yield of the alternating compolymer increased.

TABLE 23

| Exp. number | Diluent toluene (ml.) | Al(i-Bu)₃ (mmol) | VOCl₃ (mmol) | M-OR compound | Mmol | H₂O (mmol) | Metal oxide or metalloid oxide | G. | MEK soluble fraction (g.) | MEK insoluble, diethyl ether soluble fraction (g.) |
|---|---|---|---|---|---|---|---|---|---|---|
| 1 | 7.0 | 1.0 | 0.1 | Al(Oi-Pr)₃ | 0.6 | 0.3 | V₂O₅ | 0.05 | 0.10 | 2.34 |
| 2 | 7.0 | 1.0 | 0.1 | Al(Oi-Pr)₃ | 0.6 | 0.3 | TiO₂ | 0.05 | 0.08 | 2.48 |
| 3 | 7.0 | 1.0 | 0.1 | Al(Oi-Pr)₃ | 0.6 | 0.3 | Silica-alumina | 0.05 | 0.10 | 1.78 |
| Ref. 1 | 7.0 | 1.0 | 0.1 | Al(Oi-Pr)₃ | 0.6 | 0.3 | | | 0.11 | 1.58 |
| 4 | 7.0 | 1.0 | 0.1 | Ti(Oi-Pr)₄ | 0.6 | 0.6 | MgO | 0.05 | 0.09 | 2.37 |
| 5 | 7.0 | 1.0 | 0.1 | Ti(Oi-Pr)₄ | 0.6 | 0.6 | B₂O₃ | 0.05 | 0.06 | 2.18 |
| 6 | 7.0 | 1.0 | 0.1 | Ti(Oi-Pr)₄ | 0.6 | 0.6 | Synthetic zeolite | 0.75 | 0.11 | 2.22 |
| Ref. 2 | 7.0 | 1.0 | 0.1 | Ti(Oi-Pr)₄ | 0.6 | 0.6 | | | 0.15 | 2.09 |
| 7 | 7.0 | 1.0 | 0.1 | B(OEt)₃ | 0.6 | 0.6 | ZnO | 0.05 | 1.80 | 0.18 |
| Ref. 3 | 7.0 | 1.0 | 0.1 | B(OEt)₃ | 0.6 | 0.6 | | | 1.80 | 0.11 |
| 8 | 7.0 | 1.0 | 0.1 | P(On-Bu)₃ | 0.6 | 0.6 | Al₂O₃ | 0.05 | 1.67 | 0.35 |
| Ref. 4 | 7.0 | 1.0 | 0.1 | P(On-Bu)₃ | 0.6 | 0.6 | | | 1.63 | 0.13 |
| 9 | 7.0 | 1.0 | 0.1 | Si(OEt)₄ | 0.6 | 0.6 | V₂O₅ | 0.05 | 1.92 | 0.25 |
| Ref. 5 | 7.0 | 1.0 | 0.1 | Si(OEt)₄ | 0.6 | 0.6 | | | 1.87 | 0.16 |
| 10 | 7.0 | 1.0 | 0.1 | OV(OEt)₃ | 0.6 | 0.6 | SiO₂ | 0.05 | 1.42 | 0.53 |
| Ref. 6 | 7.0 | 1.0 | 0.1 | OV(OEt)₃ | 0.6 | 0.6 | | | 1.46 | 0.41 |

*i-Pr=Isopropyl; Et=Ethyl; n-Bu=n-Butyl; SiO₂/Al₂O₃ (80/20); Synthetic zeolite=Y-type.

Example 28

The usual, dry, air-free technique was employed and 10 milliliters toluene, 0.1 milliliter vanadium (V) oxychloride solution in toluene (1 molar solution), $$(O\text{---}M)_x\text{---}(O\text{---}M')_y\text{---}OR$$

compound made from 0.5 millimole aluminum triisopropoxide and 0.5 millimole water, 0.5 milliliter triethylaluminum solution in toluene (1 molar solution) and a mixture of 2 milliliters liquid propylene and 2 milliliters liquid butadiene were put successively in a 25 milliliters glass bottle at —78° C. Thereafter the bottle was sealed and allowed to copolymerize at —30° C. for 22 hours. The yield of methyl ethyl ketone soluble alternating copolymer of butadiene and propylene was 0.08 g. and that of methyl ethyl ketone insoluble and diethyl ether soluble alternating copolymer was 0.15 g.

Example 29

The usual, dry, air-free technique was employed and 10 milliliters toluene, 0.1 milliliter vanadium (V) oxychloride solution in toluene (1 molar solution), $$(O\text{---}M)_x\text{---}(O\text{---}M')_y\text{---}OR$$

compound made from 0.5 millimole aluminum triisopropoxide and 0.5 millimole water, 0.5 milliliter diethylaluminum monochloride solution in toluene (1 molar solution) and a mixture of 2 milliliters liquid propylene and 2 milliliters liquid butadiene were put successively in a 25 milliliters glass bottle at —78° C. Thereafter the bottle was sealed and allowed to copolymerize at —30° C. for 22 hours. The yield of methyl ethyl ketone soluble alternating copolymer of butadiene and propylene was 0.16 g. and that of methyl ethyl ketone insoluble and diethyl ether soluble alternating copolymer was 0.14 g.

Example 30

The usual, dry, air-free technique was employed and 10 milliliters toluene, 0.1 milliliter vanadium (V) oxychloride solution in toluene (1 molar solution), $$(O\text{---}M)_x\text{---}(O\text{---}M')_y\text{---}OR$$

compound made from 0.5 millimole aluminum triisopropoxide and 0.5 millimole water and 0.5 milliliter triisobutyl aluminum solution in toluene (1 molar solution) were put successively in a 25 milliliters glass bottle at 0° C. Then the bottle was held in a low temperature bath at —78° C. and a mixture of 2 milliliters liquid propylene and 2 milliliters liquid butadiene were put successively into the bottle also employing the usual, dry, air-free technique. Thereafter the bottle was sealed and allowed to copolymerize at —30° C. for 22 hours. The yield of methyl ethyl ketone soluble alternating copolymer of butadiene and propylene was 0.06 g. and that of methyl ethyl ketone insoluble and diethyl ether soluble alternating copolymer was 0.94 g.

Example 31

The usual, dry, air-free technique was employed and 10 milliliters toluene, 0.1 milliliter vanadium (V) oxychloride solution in toluene (1 molar solution), $$(O\text{---}M)_x\text{---}(O\text{---}M')_y\text{---}OR$$

compound made from 0.5 millimole aluminum triisopropoxide and 0.5 millimole water, 0.5 milliliter triisobutylaluminum solution in toluene (1 molar solution) and a mixture of 2 milliliters liquid propylene and 2 milliliters liquid butadiene were put successively in a 25 milliliters glass bottle at —78° C. Thereafter the bottle was sealed and allowed to copolymerize at 0° C. for 22 hours. The yield of methyl ethyl ketone soluble alternating copolymer of butadiene and propylene was 0.97 g. and that of methyl ethyl ketone insoluble and diethyl ether soluble alternating copolymer was 0.64 g.

Example 32

The usual, dry, air-free technique was employed and 10 milliliters toluene, 0.1 milliliter vanadium (V) oxychloride solution in toluene (1 molar solution), $$(O\text{---}M)_x\text{---}(O\text{---}M')_y\text{---}OR$$

compound made from 0.5 millimole aluminum triisopropoxide and 0.5 millimole water, 0.5 milliliter triisobutylaluminum solution in toluene (1 molar solution) and a mixture of 2 milliliters liquid propylene and 2 milliliters liquid butadiene were put successively in a 25 milliliters glass bottle at —78° C. Thereafter the bottle was sealed and allowed to copolymerize at —50° C. for 22 hours. The yield of methyl ethyl ketone soluble alternating copolymer of butadiene and propylene was 0.14 g. and that of methyl ethyl ketone insoluble and diethyl ether soluble alternating copolymer was 1.91 g.

Example 33

The usual, dry, air-free technique was employed and 10 milliliters toluene, 0.1 milliliter vanadium (V) oxychloride solution in toluene (1 molar solution), $$(O\text{---}M)_x\text{---}(O\text{---}M')_y\text{---}OR$$

compound made from 0.5 millimole aluminum triisopropoxide and 0.5 millimole water, 0.5 milliliter triisobutylaluminum solution in toluene (1 molar solution), 2 milliliters liquid butadiene and 2 milliliters liquid propylene were put successively in a 25 milliliters glass bottle at —78° C. Thereafter the bottle was sealed and allowed to copolymerize at —30° C. for 3.5 hours. The yield of methyl ethyl ketone soluble alternating copolymer of butadiene and propylene was 0.11 g. and that of methyl ethyl ketone insoluble and diethyl ether soluble alternating copolymer was 1.44 g.

Example 34

The usual, dry, air-free technique was employed and 10 milliliters toluene, 0.1 milliliter vanadium (V) oxychloride solution in toluene (1 molar solution), $$(O-M)_x-(O-M')_y-OR$$

compound made from 0.5 millimole aluminum triisopropoxide and 0.5 millimole water, 0.5 milliliter triisobutylaluminum solution in toluene (1 molar solution), 2 milliliters liquid propylene and 2 milliliters liquid butadiene were put successively in a 25 milliliters glass bottle at −78° C. Thereafter the bottle was sealed and allowed to copolymerize at −30° C. for 3.5 hours. The yield of methyl ethyl ketone soluble alternating copolymer of butadiene and propylene was 0.19 g. and that of methyl ethyl ketone insoluble and diethyl ether soluble alternating copolymer was 1.01 g.

Example 35

The usual, dry, air-free technique was employed and 10 milliliters toluene, 0.1 milliliter vanadium (V) oxychloride solution in toluene (1 molar solution) 2 milliliters liquid butadiene, $(O-M)_x-(O-M')_y-OR$ compound made from 0.5 millimole aluminum triisopropoxide and 0.5 millimole water, 0.5 milliliter triisobutylaluminum solution in toluene (1 molar solution) and 2 milliliters liquid propylene were put successively in a 25 milliliters glass bottle at −78° C. Thereafter the bottle was sealed and allowed to copolymerize at −30° C. for 3.5 hours. The yield of methyl ethyl ketone soluble alternating copolymer of butadiene and propylene was 0.17 g. and methyl ethyl ketone insoluble and diethyl ether soluble alternating copolymer was 1.98 g.

Example 36

The usual, dry, air-free technique was employed and 10 milliliters toluene, 0.1 milliliter vanadium (V) oxychloride solution in toluene (1 molar solution), $$(O-M)_x-(O-M')_y-OR$$

compound made from 0.5 millimole aluminum triisopropoxide and 0.5 millimole water, 2 milliliters liquid butadiene, 0.5 milliliters triisobutylaluminum solution in toluene (1 molar solution) and 2 milliliters liquid propylene were put successively in a 25 milliliters glass bottle at −78° C. Thereafter the bottle was sealed and allowed to compolymerize at −30° C. for 3.5 hours. The yield of methyl ethyl ketone soluble alternating copolymer of butadiene and propylene was 0.19 g. and that of methyl ethyl ketone insoluble and diethyl ether soluble alternating copolymer was 1.43 g.

Example 37

The usual, dry, air-free technique was employed and 10 milliliters toluene, 0.1 milliliter vanadium (V) oxychloride solution in toluene (1 molar solution), $$(O-M)_x-(O-M')_y-OR$$

compound made from 0.5 millimole aluminum triisopropoxide and 0.5 millimole water, 0.5 milliliter triisobutylaluminum solution in toluene (1 molar solution) and a mixture of 2 milliliters liquid propylene and 2 milliliters liquid butadiene were put successively in a 25 milliliters glass bottle at −78° C. Thereafter the bottle was sealed and allowed to copolymerize at −30° C. for 3.5 hours. The yield of methyl ethyl ketone soluble alternating copolymer of butadiene and propylene was 0.25 g. and that of methyl ethyl ketone insoluble and diethyl ether soluble alternating compolymer was 1.55 g.

Example 38

The usual, dry, air-free technique was employed and 5.5 milliliters toluene, 1.0 milliliter vanadium (V) oxychloride solution in toluene (1 molar solution) and 0.5 milliliter aluminum triisopropoxide solution in toluene (1 molar solution) were put successively in a 25 milliliters glass bottle at 25° C. Then the bottle was left alone at 25° C. for 10 minutes. Thereafter the bottle was held in a low temperature bath at −78° C. and 1.75 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yeild of methyl ethyl ketone soluble alternating copolymer of butadiene and propylene was 1.45 g. and methyl ethyl ketone insoluble and diethyl ether soluble fraction was 0.57 g.

Example 39

The usual, dry, air-free technique was employed and 1.0 milliliter toluene, 1.0 milliliter vanadium (V) oxychloride solution in toluene (1 molar solution) and 3.0 milliliters aluminum triisopropoxide solution in toluene (1 molar solution) were put successively in a 25 milliliters glass bottle at 25° C. Then the bottle was left alone at 25° C. for 10 minutes. Thereafter the bottle was held in a low temperature bath at −78° C. and 3.5 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.35 g. and that of methyl ethyl ketone insoluble and diethyl ether soluble alternating copolymer was 2.18 g.

Example 40

The usual, dry, air-free technique was employed and 1.0 milliliter toluene, 1.0 milliliter vanadium (V) oxychloride solution in toluene (1 molar solution) and 2.5 milliliters aluminum triisopropoxide solution in toluene (1 molar solution) were put successively in a 25 milliliters glass bottle at 25° C. Then the bottle was left alone at 25° C. for 10 minutes. Thereafter the bottle was held in a low temperature bath at −78° C. and 5.0 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.52 g. and that of methyl ethyl ketone insoluble and diethyl ether soluble alternating copolymer was 2.61 g. Intrinsic viscosity of the latter fraction measured in chloroform at 30° C. was 0.43 (dl./g.).

Example 41

The usual, dry, air-free technique was employed and 6.0 milliliters toluene, 0.05 milliliter vanadium (V) oxychloride solution in toluene (1 molar solution) and 0.30 milliliter aluminum triisopropoxide solution in toluene (1 molar solution) were put successively in a 25 milliliters glass bottle at 25° C. Then the bottle was left alone at 25° C. for 10 minutes. Thereafter the bottle was held in a low temperature bath at −78° C. and 0.5 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.04 g. and that of methyl ethyl ketone insoluble and diethyl ether soluble alternating copolymer was 0.83 g. Instrinsic viscosity of the latter fraction was 0.74 (dl./g.) measured in chloroform at 30° C.

Example 42

The usual, dry, air-free technique was employed and 4.0 milliliters toluene, 1.0 millimole vandium (IV) chloride and 2.0 milliliters aluminum triisopropoxide solution in toluene (1 molar solution) were put successively in a 25 milliliters glass bottle at 25° C. Then the bottle was left alone at 25° C. for 10 minutes. Thereafter the bottle was held in a low temperature bath at −78° C. and 2.5 milliliters triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.45 g. and that of methyl ethyl ketone insoluble and diethyl ether soluble alternating copolymer was 2.23 g.

Example 43

The usual, dry, air-free technique was employed and 8.0 milliliters toluene, 0.05 milliliter vanadium (V) oxychloride solution in toluene (1 molar solution) and (O—M)$_x$—(O—M')$_y$—OR compound made from 0.05 millimole aluminum triisopropoxide and 0.05 millimole water were put successively in a 25 milliliters glass bottle at 25° C. Then the bottle was left alone at 25° C. for 10 minutes. Thereafter the bottom was held in a low temperature bath at −78° C. and 0.125 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.58 g. and that of methyl ethyl ketone insoluble and diethyl ether soluble alternating copolymer was 1.54 g. Intrinsic viscosity of the latter fraction was 0.50 (dl./g.) measured in chloroform at 30° C.

Example 44

The usual, dry, air-free technique was employed and 8.0 milliliters toluene, 0.05 milliliter vanadium (V) oxychloride solution in toluene (1 molar solution) and (O—M)$_x$—(O—M')$_y$—OR compound made from 0.3 millimole aluminum triisopropoxide and 0.3 millimole water were put successively in a 25 milliliters glass bottle at 25° C. Then the bottle was left alone at 25° C. for 10 minutes. Thereafter the bottle was held in a low temperature bath at −78° C. and 0.25 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.19 g. and that of methyl ethyl ketone insoluble and diethyl ether soluble alternating copolymer was 2.21 g. Intrinsic viscosity of the latter fraction was 0.71 (dl./g.) measured in chloroform at 30° C.

Example 45

The usual, dry, air-free technique was employed and 8.0 milliliters toluene, 0.05 milliliter vanadium (V) oxychloride solution in toluene (1 molar solution) and (O—M)$_x$—(O—M')$_y$—OR compound made from 0.60 millimole aluminum triisopropoxide and 0.6 millimole water were put successively into a 25 milliliters glass bottle at 25° C. Then the bottle was left alone at 25° C. for 10 minutes. Thereafter the bottle was held in a low temperature bath at −78° C. and 0.50 milliliter triisobutylaluminum solution in toluene (1 mole solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.11 g. and that of methyl ethyl ketone insoluble and diethyl ether soluble alternating copolymer was 1.56 g. Intrinsic viscosity of the latter fraction was 0.78 measured in chloroform at 30° C.

Example 46

The usual, dry, air-free technique was employed and 7.5 milliliters toluene, 0.1 milliliter vanadium (V) oxychloride solution in toluene (1 molar solution) and (O—M)$_x$—(O—M')$_y$—OR compound made from 0.6 millimole aluminum triisopropoxide and 0.3 millimole water were put successively in a 25 milliliters glass bottle at 25° C. Then the bottle was left alone at 25° C. for 10 minutes. Therefore the bottle was held in a low temperature bath at −78° C. and 1.0 milliliter triisobutylaluminum solution in toluene (1 molar solution) and a mixture of 2 milliliters liquid propylene, 2 milliliters liquid butadiene and 2 milliliters toluene were put successively into the bottle also employing the usual, dry, air-free technique. Thereafter the bottle was sealed and allowed to copolymerize at −30° C. for 16 hours. The yield of methyl ethyl ketone soluble alternating copolymer of butadiene and propylene was 0.11 g. and that of methyl ethyl ketone insoluble and diethyl ether soluble alternating copolymer was 1.91 g. Intrinsic viscosity of the latter fraction was 0.66 (dl./g.) measured in chloroform at 30° C.

Example 47

The usual, dry, air-free technique was employed and 7.0 milliliters toluene, 0.1 milliliter vanadium (V) oxychloride solution in toluene (1 molar solution) and 0.3 millimole M—OR compound were put successively in a 25 milliliters glass bottle at 25° C. Then the bottle was left alone at 25° C. for 10 minutes. Thereafter the bottle was held in a low temperature bath at −78° C. and varying amounts of triisobutylaluminum solution in toluene (1 molar solution) and a mixture of 2 milliliters liquid butene-1 and 2 milliliters liquid butadiene were put successively into the bottle also employing the usual, dry, air-free technique. Thereafter the bottle was sealed and allowed to copolymerize at −30° C. for 18 hours. The results are summarized in Table 24.

TABLE 24

| Exp. Number | Diluent toluene (ml.) | Catalysts * | | | | Yield of alternating copolymer | |
|---|---|---|---|---|---|---|---|
| | | Al(i-Bu)$_3$ (mmol) | VOCl$_3$ (mmol) | M-OR compound | Mmol | MEK soluble fraction (g.) | MEK insoluble diethyl ether soluble fraction (g.) |
| 1 | 7.0 | 0.5 | 0.1 | Al(Osec-Bu)$_3$ | 0.3 | 0.84 | 1.05 |
| 2 | 7.0 | 0.5 | 0.1 | NaOEt | 0.3 | 1.22 | 0.75 |
| 3 | 7.0 | 1.0 | 0.1 | Al(Oi-Pr)$_3$ | 0.3 | 0.18 | 1.00 |

* sec-Bu=sec-Butyl; i-Pr=Isopropyl.

Example 48

The usual, dry, air-free technique was employed and 7.0 milliliters toluene, 0.1 milliliter vanadium (V) oxychloride solution in toluene (1 molar solution) and varying amounts of (O—M)$_x$—(O—M')$_y$—OR compounds were put successively in a 25 milliliters glass bottle at 25° C. Then the bottle was left alone at 25° C. for 10 minutes. Thereafter the bottle was held in a low temperature bath at —78° C. and 1.0 milliliter organoaluminum compound solution in toluene (1 molar solution) and a mixture of 2 milliliters liquid butene-1 and 2 milliliters liquid butadiene were put successively into the bottle also employing the usual, dry, air-free technique. Thereafter the bottle was sealed and allowed to copolymerize at —30° C. for 18 hours. The results are summarized in Table 25. The (O—M)$_x$—(O—M')$_y$—OR compound used in Exp. No. 1 was prepared by the method described in Example 7.

Example 49

The usual, dry, air-free technique was employed and 0.05 millimole titanium tetrachloride or 0.02 g. vanadium pentoxide, 7.0 milliliters toluene, 0.1 milliliter vanadium (V) oxychloride solution in toluene (1 molar solution) or 0.1 milliliter vanadium (IV) chloride solution in methylene chloride (1 molar solution) and

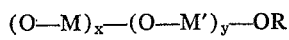
(O—M)$_x$—(O—M')$_y$—OR compound were put in a 25 milliliters glass bottle at 25° C. Then the bottle was left alone at 25° C. for 10 minutes. Thereafter the bottle was held in a low temperature bath at —78° C. and 1.0 milliliter organoaluminum compound solution in toluene (1 molar solution) and a mixture of 2 milliliters liquid butene-1 and 2 milliliters liquid butadiene were put successively into the bottle also employing the usual, dry, air-free technique. Thereafter the bottle was sealed and allowed to copolymerize at —30° C. for 18 hours. The results are summarized in Table 26.

Example 50

The usual, dry, air-free technique was employed and 7.0 milliliters toluene, 0.1 milliliter vanadium (V) oxychloride solution in toluene (1 molar solution) or 0.1 milliliter vanadium (IV) chloride solution in methylene chloride (1 molar solution) and (O—M)$_x$—(O—M')$_y$—OR compound made from aluminum triisopropoxide and water were put successively in a 25 milliliters glass bottle at 25° C. Then the bottle was left alone at 25° C. for 10 minutes. Thereafter the bottle was held in a low temperature bath at —78° C. and 1.0 milliliter triisobutylaluminum solution in toluene (1 molar solution) and a mixture of 2.8 milliliters liquid pentene-1 and 2 milliliters liquid butadiene were put successively into the bottle also employing the usual, dry, air-free technique. Thereafter the bottle was sealed and allowed to copolymerize at —30° C. for 40 hours. The results are summarized in Table 27.

Example 51

The usual, dry, air-free technique was employed and 7.0 milliliters toluene, 0.1 milliliter vanadium (V) oxychloride solution in toluene and (O—M)$_x$—(O—M')$_y$—OR compound were put successively in a 25 milliliters glass bottle at 25° C. Then the bottle was left alone at 25° C. for 10 minutes. Thereafter the bottle was held in a low temperature bath at —78° C. and 1.0 milliliter organoaluminum compound solution in toluene (1 molar solution) and a mixture of 2 milliliters liquid 4-methyl pentene-1 and 2 milliliters liquid butadiene were put successively into the bottle also employing the usual, dry, air-free technique. Thereafter the bottle was sealed and allowed to copolymerize at —30° C. for 40 hours. The results are summarized in Table 28.

TABLE 25

| Exp. number | Diluent toluene (ml.) | Organo-aluminum compound | Mmol | VOCl$_3$ (mmol) | Al-R or Al-OR compound | (mmol) | H$_2$O (mmol) | i-PrOH | MEK soluble fraction (g.) | MEK insoluble diethyl ether soluble fraction (g.) |
|---|---|---|---|---|---|---|---|---|---|---|
| 1 | 7.0 | Al(i-Bu)$_3$ | 1.0 | 0.1 | AlEt$_3$ | 1.0 | 1.0 | Excess | 0.26 | 1.19 |
| 2 | 7.0 | AlEt$_2$Cl | 1.0 | 0.1 | Al(Oi-Pr)$_3$ | 0.5 | 0.5 | | 0.08 | 0.01 |

*i-Pr=Isopropyl; Et: Ethyl.

TABLE 26

| Exp. number | Diluent toluene (ml.) | Organo-aluminum compound | Mmol | V-X compound | Mmol | M-OR compound | Mmol | H$_2$O (mmol) | Halogen compound or metal oxide | MEK soluble fraction (g.) | MEK insoluble diethyl ether soluble fraction (g.) |
|---|---|---|---|---|---|---|---|---|---|---|---|
| 1 | 7.0 | AlEt$_3$ | 1.0 | VOCl$_3$ | 0.1 | B(OEt)$_3$ | 0.5 | 0.5 | TiCl$_4$, mmol 0.05 | 0.85 | 0.28 |
| 2 | 7.0 | Al(i-Bu)$_3$ | 1.0 | VCl$_4$ | 0.1 | P(On-Bu)$_3$ | 0.5 | 0.5 | V$_2$O$_5$, g. 0.02 | 1.02 | 0.70 |

*Et=Ethyl; n-Bu=n-Butyl.

TABLE 27

| Exp. number | Diluent toluene (ml.) | Al(i-Bu)$_3$ (mmol) | VX compound | (Mmol) | M-OR compound | Mmol | H$_2$O (mmol) | MEK soluble fraction (g.) | MEK insoluble, diethyl ether soluble fraction (g.) |
|---|---|---|---|---|---|---|---|---|---|
| 1 | 7.0 | 1.0 | VOCl$_3$ | 0.1 | Al(Oi-Pr)$_3$ | 0.1 | 0.05 | 0.36 | 1.00 |
| 2 | 7.0 | 1.0 | VCl$_4$ | 0.1 | Al(Oi-Pr)$_3$ | 0.1 | 0.1 | 0.09 | 0.45 |

*i-Pr=Isopropyl.

TABLE 28

| Exp. number | Diluent toluene (ml.) | Catalysts* Organo- aluminum compound | Mmol | VOCl₃ (mmol) | Raw material composition for (O-M)ₓ-(O-M')ᵧ-OR compounds M-OR compound | Mmol | H₂O (mmol) | Yield of alternating copolymer MEK soluble fraction (g.) | MEK insoluble, diethyl ether soluble fraction (g.) |
|---|---|---|---|---|---|---|---|---|---|
| 1 | 7.0 | Al(i-Bu)₃ | 1.0 | 0.1 | Al(Oi-Pr)₄ | 0.1 | 0.05 | 0.41 | 1.84 |
| 2 | 7.0 | AlEt₃ | 1.0 | 0.1 | OV(OEt)₃ | 1.0 | 1.0 | 0.28 | 1.18 |

*i-Bu=Isobutyl; i-Pr=Isopropyl; Et=Ethyl.

Example 52

The usual, dry, air-free technique was employed and 7.0 milliliters toluene, 0.1 milliliter vanadium (IV) chloride solution in methylene chloride (1 molar solution) and 0.1 mmole triphenyl borate were put in a 25 milliliters glass bottle at 25° C. Then the bottle was left alone at 25° C. for 10 minutes. Thereafter the bottle was held in a low temperature bath at −78° C. and 0.5 milliliter triisobutylaluluminum solution in toluene (1 molar solution) and a mixture of 2 milliliters liquid 4-methyl-pentene-1 and 2- milliliters liquid butadiene were put successively into the bottle also employing the usual, dry, air-free technique. Thereafter the bottle was sealed and allowed to copolymerize at −30° C. for 29 hours. The yield of methyl ethyl ketone soluble alternating copolymer of butadiene and 4-methyl-pentene-1 was 0.23 g. and that of methyl ethyl ketone insoluble and diethyl ether soluble alternating copolymer was 0.95 g.

Example 53

The usual, dry, air-free technique was employed and 10.0 milliliters toluene, 0.1 milliliter vanadium (V) oxychloride solution in toluene (1 molar solution) or 0.1 milliliter vanadium (IV) chloride solution in methylene chloride (1 molar solution) and $$(O-M)_x-(O-M')_y-OR$$

compound were put successively in a 25 milliliters glass bottle at 25° C. Then the bottle was left alone at 25° C. for 10 minutes. Thereafter the bottle was held in a low temperature bath at −78° C. and varying amounts of organoaluminum compound solution in toluene (1 molar solution) and a mixture of 3.1 milliliters liquid hexene-1 and 2 milliliters liquid butadiene were put successively into the bottle also employing the usual, dry, air-free technique. Thereafter the bottle was sealed and allowed to copolymerize at various polymerization conditions. The results are summarized in Table 29.

TABLE 29

| Exp. No. | Organo- aluminum compound | Mmol | V.X. compound | Mmol | M-OR or Al-R compound | Mmol | H₂O or carboxylate | Mmol | ROH | Temperature (°C.) | Interval (hr.) | MEK soluble fraction (g.) | MEK insoluble, diethyl ether soluble fraction (g.) |
|---|---|---|---|---|---|---|---|---|---|---|---|---|---|
| 1 | Al-Et₃ | 1.0 | VOCl₃ | 0.1 | Al(Oi-Pr)₃ | 1.0 | H₂O | 0.25 | | −30 0 | 14 and 81. | 0.24 | 0.02 |
| 2 | Al(i-Bu)₃ | 1.0 | VOCl₃ | 0.1 | AlEt₃ | 1.0 | H₂O | 1.0 | i-PrOH Excess | 0 | 66 | 0.69 | 0.13 |
| 3 | AlEt₃ | 1.0 | VOCl₃ | 0.1 | Al(OiPr)₃ | 1.0 | Zr(CH₃COO)₄ | 0.25 | | −30 0 | 14 and 52. | 0.30 | 0.05 |
| 4 | Al(i-Bu)₃ | 0.5 | VCl₄ | 0.1 | Ti(Oi-Pr)₄ | 0.5 | H₂O | 0.5 | | 0 | 66 | 0.67 | 0.74 |
| 5 | Al(i-Bu)₃ | 1.0 | VOCl₃ | 0.1 | Al(Oi-Pr)₃ | 0.1 | H₂O | 0.05 | | −30 | 40 | 0.38 | 1.99 |

Example 54

The usual, dry, air-free technique was employed and 10.0 milliliters toluene, 0.1 milliliter vanadium (V) oxychloride solution in toluene (1 molar solution) or 0.1 milliliter vanadium (IV) chloride solution in methylene chloride (1 molar solution) and 0.1 millimole aluminum chloride ether complex or 0.02 g. metal oxide were put successively in a 25 milliliters glass bottle at 25° C. Then the bottle was left alone at 25° C. for 10 minutes. Thereafter the bottle was held in a low temperature bath at −78° C. and varying amounts of organoaluminum compound in toluene (1 molar solution) and a mixture of 3.1 milliliters liquid hexene-1 and 2 milliliters liquid butadiene were put successively into the bottle also employing the usual, dry, air-free technique. Thereafter the bottle was sealed and allowed to copolymerize at various polymerization conditions. The results are summarized in Table 30.

TABLE 30

| Exp. No. | Organo- aluminum compound | Mmol | V.X. compound | Mmol | M—OR compound | Mmol | Carboxylate or H₂O | Mmol | Halogen compound or metal oxide | Temperature (°C.) | Interval (hr.) | MEK soluble fraction (g.) | MEK insoluble, diethyl ether soluble fraction (g.) |
|---|---|---|---|---|---|---|---|---|---|---|---|---|---|
| 1 | AlEt₃ | 1.0 | VOCl₃ | 0.1 | B(OEt)₃ | 1.0 | H₂O | 1.0 | AlCl₃·OEt₂, 0.1 mmol. | −30 0 | 14 and 52. | 0.97 | 1.03 |
| 2 | Al(i-Bu)₃ | 0.5 | VOCl₃ | 0.1 | Al(Oi-Pr)₃ | 0.5 | H₂O | 0.125 | V₂O₅, g 0.02 | −30 0 | 14 and 52. | 0.28 | 0.10 |
| 3 | Al(i-Bu)₃ | 1.0 | VCl₄ | 0.1 | P(On-Bu)₃ | 0.5 | Cd(CH₃COO)₂ | 0.25 | B₂O₃, g 0.02 | 0 | 95 | 0.90 | 1.26 |

*Et=Ethyl; i-Bu=Isobutyl; i-Pr=Isopropyl; n-Bu=n-Butyl.

Example 55

The usual, dry, air-free technique was employed and 10.0 milliliters toluene, 0.1 millimole vanadium (V) oxychloride solution in toluene (1 molar solution), 0.5 millimole triphenyl phosphite and 0.1 millimole of stannic chloride were put successively in a 25 milliliters glass bottle at 25° C. Then the bottle was left alone at 25° C. for 10 minutes. Thereafter the bottle was held in a low temperature bath at −78° C. and 1.0 milliliter triisobutylaluminum solution in toluene (1 molar solution) and a mixture of 3.1 milliliters liquid hexene-1 and 2 milliliters liquid butadiene were put successively into the bottle also employing the usual, dry, air-free technique. Thereafter the bottle was sealed and allowed to copolymerize at 0° C. for 95 hours. The yield of methyl ethyl ketone soluble alternating copolymer of butadiene and hexene-1 was 0.83 g. and that of methyl ethyl ketone insoluble and diethyl ether soluble alternating copolymer was 0.75 g.

the bottle also employing the usual, dry, air-free technique. Thereafter the bottle was sealed and allowed to copolymerize at various polymerization conditions. The results are summarized in Table 32.

TABLE 32

| | Catalysts* | | | | | | | Polymerization conditions | | Yield of diethyl ether soluble alternating copolymer butadiene and styrene (g.) |
|---|---|---|---|---|---|---|---|---|---|---|
| | Organo-aluminum compound | | V.X. compound | | Raw material compositions for (O-M)$_x$-(O-M')$_y$-OR compound | | | Temperature (° C.) | Interval (hr.) | |
| Exp. No. | | Mmol | | Mmol | M-OR or Al-R compound | Mmol | H$_2$O and carboxylate | Mmol | ROH | | | |
| 1 | AlEt$_3$ | 1.0 | VOCl$_3$ | 0.1 | Al(Oi-Pr)$_3$ | 1.0 | Al$_2$O(CH$_3$COO)$_4$ | 0.25 | | 0 | 42 | 0.14 |
| 2 | Al(i-Bu)$_3$ | 1.0 | VCl$_4$ | 0.1 | AlEt$_2$Cl | 0.5 | H$_2$O | 0.5 | i-PrOH Excess | −30 | 42 | 0.82 |
| 3 | AlEt$_3$ | 1.0 | VCl$_4$ | 0.1 | Al(Oi-Pr)$_3$ | 1.0 | H$_2$O | 1.0 | | 0 | 70 | 0.18 |

*Et=Ethyl; i-Bu=Isobutyl; i-Pr=isopropyl.

Example 56

The usual, dry, air-free technique was employed and 5.0 milliliter toluene, 0.1 milliliter vanadium (V) oxychloride solution in toluene (1 molar solution) or 0.1 milliliter vanadium (IV) chloride solution in methylene chloride (1 molar solution) and varying amounts of M—OR compound were put successively in a 25 milliliters glass bottle at 25° C. Then the bottle was left alone at 25° C. for 10 minutes. Thereafter the bottle was held in a low temperature bath at −78° C. and varying amounts of triisobutylaluminum solution in toluene (1 molar solution), 3 milliliters styrene and 2 milliliters liquid butadiene were put successively into the bottle also employing the usual, dry, air-free technique. Thereafter the bottle was sealed and allowed to copolymerize at −30° C. for 42 hours. The results are summarized in Table 31.

TABLE 31

| Exp. No. | Diluent toluene | Catalysts* | | | | | Yield of diethyl ether soluble alternating copolymer of butadiene and styrene (g.) |
|---|---|---|---|---|---|---|---|
| | | Al(i-Bu)$_3$ (mmol) | V.X. compound | Mmol | M-OR compound | Mmol | |
| 1 | 5.0 | 1.0 | VOCl$_3$ | 0.1 | B(OC$_6$H$_5$)$_3$ | 0.3 | 0.27 |
| 2 | 5.0 | 0.5 | VCl$_4$ | 0.1 | P(OC$_6$H$_5$)$_3$ | 0.1 | 0.70 |

*C$_6$H$_5$=Phenyl; i-Bu=Isobutyl.

Example 57

The usual, dry, air-free technique was employed and 5.0 milliliters toluene, 0.1 milliliter vanadium (V) oxychloride solution in toluene or 0.1 milliliter vanadium (IV) chloride solution in methylene chloride and varying amounts (O—M)$_x$—(O—M')$_y$—OR compound were put successively into a 25 milliliters glass bottle at 25° C. Then the bottle was left alone at 25° C. for 10 minutes. Thereafter the bottle was held in a low temperature bath at −78° C. and 1.0 milliliter organoaluminum compound in toluene (1 molar solution), 3 milliliters styrene and 2 milliliters liquid butadiene were put successively into

What we claim is:

1. A 1:1 copolymer of butadiene and an α-olefin having alternating butadiene and α-olefin units, said α-olefin having the formula H$_2$C=CHR wherein R represents a C$_1$—C$_4$ normal or branched chain lower alkyl radical, and said copolymer having an intrinsic viscosity of higher than about 0.55 dl./g. in chloroform at 30° C. and wherein the butadiene units of said copolymer are substantially of trans 1-4 configuration.

2. A copolymer of Claim 1 having an intrinsic viscosity value of higher than about 0.55 to about 0.96.

3. A copolymer of Claim 1, wherein the α-olefin is propylene.

4. A copolymer of Claim 1, wherein the α-olefin is butene-1.

5. A copolymer of Claim 1, wherein the α-olefin is pentene-1.

6. A copolymer of Claim 1, wherein the α-olefin is 4-methyl pentene-1.

7. A copolymer of Claim 1, wherein the α-olefin is hexene-1.

References Cited
UNITED STATES PATENTS

| 3,700,638 | 10/1972 | Kawasaki et al. | 260—85.3 R |
| 3,714,133 | 1/1973 | Kawasaki et al. | 260—85.3 R |
| 3,652,518 | 3/1972 | Kawasaki et al. | 260—85.3 R |
| 3,737,416 | 6/1973 | Hayashi et al. | 260—85.3 R |

JOSEPH L. SCHOFER, Primary Examiner

A. HOLLER, Assistant Examiner

UNITED STATES PATENT OFFICE
CERTIFICATE OF CORRECTION

PATENT NO. : 3,824,224
DATED : July 16, 1974
INVENTOR(S) : AKIHIRO KAWASAKI et al It is certified that error appears in the above-identified patent and that said Letters Patent are hereby corrected as shown below:

Column 1, line 12: "47,913" should be --- 47,918 --- .

Column 1, line 13: "54,143" should be --- 64,143 --- .

Column 1, line 64: "to product" should be --- to produce --- .

Column 4, line 11: "$AlR_n(OOH)_{3-n}$" should be -- $AlR_n(OR)_{3-n}$ -- .

Column 4, line 53: "troxide" should be -- trioxide --- .

Column 7, line 62: "a -78°C" should be --- at -78°C --- .

Column 10, line 25: "butadene" should be --- butadiene --- .

Column 10, line 43: "unde" should be --- under --- .

Columns 9-10, Table 6: in the sub-heading, "$(O-M)_x-(O-M')_y$ compounds" should be --- $(O-M)_x-(O-M')_y-OR$ compounds --- .

Column 11, Table 7: in the sub-heading, "$VOCl_4$" should be --- $VCl_4$ --- .

Column 11, Table 8: in the sub-heading, "$VOCl_4$" should be --- $VOCl_3$ --- .

UNITED STATES PATENT OFFICE
CERTIFICATE OF CORRECTION

PATENT NO. : 3,824,224
DATED : July 16, 1974
INVENTOR(S) : AKIHIRO KAWASAKI et al It is certified that error appears in the above-identified patent and that said Letters Patent are hereby corrected as shown below:

Column 14, line 23: "Table 11 Ref." should be --- Table 11. Ref. --- .

Column 17, Table 14, Experiment No. 11: "VLCl$_3$" should be --- VOCl$_3$--- .

Columns 19-20, Table 16: in the sub-heading, "diethy, ether" should be --- diethyl ether --- .

Column 19, line 28: "porpylene" should be --- propylene --- .

Column 24, Table 21: in the sub-heading, "diethyl soluble" should be --- diethyl ether soluble --- .

Columns 25-26, Table 23: to the right of "synthetic zeolite", "0.75" should be --- 0.05 --- .

Column 33, line 35: "isobutylaluluminum" should be --- isobutylaluminum --- .

Columns 33-34, Table 30: beside "AlCl$_3$·OEt$_2$", numbers should be: --- $0.1 \begin{Bmatrix} -30 \\ 0 \end{Bmatrix}$ --- instead of "$0.1 \begin{Bmatrix} -30 \\ 0 \end{Bmatrix}$" .

Signed and sealed this 13th day of May 1975.

(SEAL)
Attest:

RUTH C. MASON
Attesting Officer

C. MARSHALL DANN
Commissioner of Patents
and Trademarks